United States Patent
Le Leannec et al.

(10) Patent No.: US 11,785,236 B2
(45) Date of Patent: Oct. 10, 2023

(54) PARAMETER GROUPING AMONG PLURAL CODING UNITS FOR VIDEO ENCODING AND DECODING

(71) Applicant: InterDigital Madison Patent Holdings, SAS, Paris (FR)

(72) Inventors: Fabrice Le Leannec, Mouazé (FR); Tangi Poirier, Thorigné-Fouillard (FR); Karam Naser, Mouazé (FR)

(73) Assignee: InterDigital Madision Patent Holdings, SAS, Paris (FR)

( * ) Notice: Subject to any disclaimer, the term of this patent is extended or adjusted under 35 U.S.C. 154(b) by 0 days.

(21) Appl. No.: 17/290,302

(22) PCT Filed: Oct. 31, 2019

(86) PCT No.: PCT/US2019/059028
§ 371 (c)(1),
(2) Date: Apr. 30, 2021

(87) PCT Pub. No.: WO2020/096848
PCT Pub. Date: May 14, 2020

(65) Prior Publication Data
US 2021/0385471 A1    Dec. 9, 2021

(30) Foreign Application Priority Data
Nov. 6, 2018   (EP) .................................. 18306450

(51) Int. Cl.
*H04N 19/436*   (2014.01)
*H04N 19/124*   (2014.01)

(52) U.S. Cl.
CPC ......... *H04N 19/436* (2014.11); *H04N 19/124* (2014.11)

(58) Field of Classification Search
CPC .................................................... H04N 19/436
(Continued)

(56) References Cited

U.S. PATENT DOCUMENTS 8,363,965 B2   1/2013   Choi et al.
9,591,307 B2   3/2017   Na et al.
(Continued)

FOREIGN PATENT DOCUMENTS

WO   WO2016074567 A1   5/2016
WO   WO2018070742 A1   4/2018
WO   WO 2018164505 A1   9/2018

OTHER PUBLICATIONS

Xu, Meng, et al., "CE1-related: Non-square virtual pipeline data unit", JVET of ITU-T SG 16 WP 3 and ISO/IEC JTC 1/SC 29/WG 11, 12th Meeting: Macao, CN, Oct. 3-12, 2018, Document: JVET-L0313-v2, 4 pages.
(Continued)

*Primary Examiner* — Yulin Sun
(74) *Attorney, Agent, or Firm* — Smadar Gefen

(57) ABSTRACT

At least a method and an apparatus are presented for encoding or decoding video and can involve, for example, obtaining a group of coding units including two or more of a plurality of coding units divided from a current block wherein the two or more of the plurality of coding units share a coding parameter, and the group of coding units overlaps at least two different pipeline units associated with a pipelined decoding operation, and encoding or decoding the current block based on the group of coding units, and the shared coding parameter.

16 Claims, 23 Drawing Sheets

(58) Field of Classification Search
USPC .................................................. 375/240.24
See application file for complete search history.

(56) References Cited

U.S. PATENT DOCUMENTS

| | | | | |
|---|---|---|---|---|
| 2012/0163452 | A1* | 6/2012 | Horowitz | H04N 19/61 375/240.12 |
| 2014/0362919 | A1* | 12/2014 | Zhou | H04N 19/172 375/240.16 |
| 2019/0007680 | A1* | 1/2019 | Chen | H04N 19/15 |
| 2019/0222859 | A1* | 7/2019 | Chuang | H04N 19/96 |
| 2020/0204826 | A1* | 6/2020 | Rath | H04N 19/593 |
| 2020/0288145 | A1* | 9/2020 | Chuang | H04N 19/11 |

OTHER PUBLICATIONS

Hsu, Chih-Wei, et al., "CE1-related: Constraint for binary and ternary partitions", JVET of ITU-T SG 16 WP 3 and ISO/IEC JTC 1/SC 29/WG 11, 11th Meeting: Ljubljana, SI, Jul. 10-18, 2018, Document: JVET-K0556-v2, 4 pages.

Bross et al., "Versatile Video Coding (Draft 2)", Joint Video Experts Team (JVET) of ITU-T SG 16 WP 3 and ISO/IEC JTC 1/SC 29/WG 11, Document: JVET-K1001-v1, 11th Meeting: Ljubljana, Slovenia, Jul. 10, 2018, 41 pages.

Telecom, "High efficiency video coding", Series H: Audiovisual and Multimedia Systems. Infrastructure of audiovisual services—Coding of moving video, Recommendation ITU-T H.265, Oct. 2014, 540 pages.

Zhao et al., "CE6: Sub-block transform for inter blocks (CE6.1.2)", Joint Video Experts Team (JVET) of ITU-T SG 16 WP3 and ISO/IEC JTC 1/SC 29/WG 11, Document: JVET-L0358-v2, 12th Meeting: Macao, China, Oct. 3, 2018, 9 pages.

Chen et al., "Algorithm Description for Versatile Video Coding and Test Model 1 (VTM 1)", Joint Video Experts Team (JVET) of ITU-T SG 16 WP 3 and ISO/IEC JTC 1/SC 29/WG 11, Document JVET-J1002-v1, 10th Meeting: San Diego, California, United States, Apr. 10, 2018, 7 pages.

* cited by examiner (A)

| Sequence | Target Bitrate | HEVC | | | |
|---|---|---|---|---|---|
| | | Bitrate | Y-PSNR | U-PSNR | V-PSNR |
| BQTerrace | QP30, QPIncFrame=288 | 2652.25 | 34.28 | 40.23 | 42.73 |
| | 1500 | 1498.38 | 33.32 | 39.53 | 42.09 |
| | 1000 | 994.96 | 32.43 | 38.78 | 41.38 |
| | 600 | 597.46 | 31.01 | 38.29 | 40.90 |
| | 400 | 396.44 | 29.72 | 37.75 | 40.35 |
| RitualDance | QP27 | 5474.28 | 40.82 | 44.90 | 45.29 |
| | 3800 | 3798.67 | 39.02 | 43.93 | 44.24 |
| | 2300 | 2299.61 | 36.63 | 42.82 | 43.01 |
| | 1500 | 1499.74 | 34.72 | 41.79 | 41.86 |
| | 900 | 899.81 | 32.64 | 40.88 | 40.77 |
| MarketPlace | QP31, QPIncFrame=288 | 3047.91 | 36.28 | 41.14 | 42.20 |
| | 2000 | 1998.44 | 35.03 | 40.61 | 41.68 |
| | 1200 | 1199.96 | 33.57 | 39.84 | 40.86 |
| | 800 | 799.31 | 32.28 | 39.41 | 40.42 |
| | 500 | 499.95 | 30.97 | 38.79 | 39.70 |
| BasketballDrive | QP26, QPIncFrame=144 | 5749.51 | 37.54 | 42.71 | 43.27 |
| | 3500 | 3496.44 | 36.41 | 41.97 | 42.21 |
| | 2000 | 1999.69 | 34.80 | 41.12 | 41.03 |
| | 1200 | 1199.28 | 33.18 | 40.16 | 39.72 |
| | 800 | 799.35 | 31.84 | 39.43 | 38.65 |
| Cactus | QP30, QPIncFrame=456 | 3282.43 | 35.81 | 38.72 | 41.22 |
| | 2000 | 1999.85 | 34.32 | 38.18 | 40.22 |
| | 1200 | 1199.98 | 32.64 | 37.48 | 39.07 |
| | 800 | 797.35 | 31.24 | 37.06 | 38.38 |
| | 500 | 499.78 | 29.59 | 36.51 | 37.48 |
| Average SDR-B | | | | | |

FIG. 8

| Bitrate | Tested Coding Structure | | | Average Bitrate Difference | | |
|---|---|---|---|---|---|---|
| | Y-PSNR | U-PSNR | V-PSNR | Y | U | V |
| 1674.02 | 33.76 | 40.06 | 42.75 | -13.29% | -30.10% | -40.81% |
| 1126.62 | 33.02 | 39.46 | 42.25 | -13.47% | -35.55% | -48.65% |
| 687.86 | 31.83 | 38.95 | 41.81 | | | |
| 460.74 | 30.73 | 38.58 | 41.49 | | | |
| 4497.19 | 40.42 | 44.72 | 45.13 | -12.17% | -16.26% | -16.51% |
| 2727.26 | 38.02 | 43.50 | 43.78 | -12.49% | -17.27% | -17.33% |
| 1788.21 | 36.10 | 42.66 | 42.83 | | | |
| 1065.93 | 33.89 | 41.74 | 41.74 | | | |
| 2350.77 | 35.75 | 40.93 | 42.04 | -10.23% | -13.11% | -15.81% |
| 1430.43 | 34.34 | 40.22 | 41.31 | -10.54% | -16.31% | -19.42% |
| 961.64 | 33.20 | 39.89 | 40.96 | | | |
| 608.81 | 32.00 | 39.40 | 40.44 | | | |
| 4063.70 | 37.12 | 42.60 | 43.06 | -14.91% | -26.62% | -24.54% |
| 2377.88 | 35.79 | 41.86 | 42.01 | -15.30% | -27.11% | -24.64% |
| 1454.91 | 34.33 | 41.09 | 40.92 | | | |
| 978.97 | 33.08 | 40.56 | 40.03 | | | |
| 2510.10 | 35.37 | 38.59 | 40.94 | -11.37% | -17.83% | -18.81% |
| 1543.59 | 33.87 | 38.04 | 40.03 | -11.50% | -20.76% | -21.85% |
| 1034.12 | 32.54 | 37.61 | 39.30 | | | |
| 652.16 | 30.99 | 37.13 | 38.51 | | | |
| | | | | -12.39% | -20.78% | -23.30% |

FIG. 8 (Continued)

PARAMETER GROUPING AMONG PLURAL CODING UNITS FOR VIDEO ENCODING AND DECODING

CROSS-REFERENCE TO RELATED APPLICATIONS

This application is a 35 U.S.C. § 371 National Stage of PCT Application No. PCT/US2019/059028, filed Oct. 31, 2019, which claims priority to EP patent application 18306450, filed Nov. 6, 2018, the contents of all of which are hereby incorporated by reference herein in their entireties.

TECHNICAL FIELD

The present embodiments generally relate to a method and an apparatus for video encoding or decoding, and more particularly, to a method and an apparatus for efficiently encoding and decoding of video in which a plurality of coding units divided from a current block and having the same prediction information are grouped together for the encoding or decoding.

BACKGROUND

To achieve high compression efficiency, image and video coding schemes usually employ predictive and transform coding to leverage spatial and temporal redundancy in the video content. Generally, intra or inter prediction is used to exploit the intra or inter frame correlation, then the differences between the original blocks and the predicted blocks, often denoted as prediction errors or prediction residuals, are transformed, quantized, and entropy coded. To reconstruct the video, the compressed data are decoded by inverse processes corresponding to the encoding, e.g., prediction, entropy decoding, inverse quantization and inverse transform.

Recent additions to video compression technology include various versions of the reference software and/or documentations Joint Exploration Model (JEM) and VVC (Versatile Video Coding) being developed by the Joint Video Exploration Team (WET) as part of development of a new video coding standard known as Versatile Video Coding (VVC). The aim of VVC is to make further improvements to the existing HEVC (High Efficiency Video Coding) standard.

SUMMARY

According to a general aspect of at least one embodiment in accordance with the present disclosure, a method for video encoding is presented, comprising dividing a current block into a plurality of coding units; grouping the plurality of coding units into a plurality of groups of coding units wherein the grouped coding units in each group of the plurality of groups of coding units having same prediction information; and encoding the current block based on the plurality of groups of coding units and the respective same prediction information.

According to a general aspect of at least one embodiment, a method for video decoding is presented comprising obtaining a plurality of groups of coding units corresponding to a plurality of coding units divided from a current block wherein grouped coding units in each group of the plurality of groups of coding units having same prediction information; and decoding the current block based on the plurality of groups of coding units and the respective same prediction information.

According to a general aspect of at least one embodiment, an apparatus for video encoding is presented, comprising one or more processors configured to divide a current block into a plurality of coding units; group the plurality of coding units into a plurality of groups of coding units wherein the grouped coding units in each group of the plurality of groups of coding units having same prediction information; and encode the current block based on the plurality of groups of coding units and the respective same prediction information.

According to another general aspect of at least one embodiment, an apparatus for video decoding is presented comprising one or more processors configured to obtain a plurality of groups of coding units corresponding to a plurality of coding units divided from a current block wherein grouped coding units in each group of the plurality of grouped coding units having same prediction information; and decode the current block based on the plurality of groups of coding units and the respective same prediction information.

According to a general aspect of at least one embodiment in accordance with the present disclosure, an apparatus for video encoding is presented, comprising means for dividing a current block into a plurality of coding units; means for grouping the plurality of coding units into a plurality of groups of coding units wherein the grouped coding units in each group of the plurality of groups of coding units having same prediction information; and means for encoding the current block based on the plurality of groups of coding units and the respective same prediction information.

According to a general aspect of at least one embodiment, an apparatus for video decoding is presented comprising means for obtaining a plurality of groups of coding units corresponding to a plurality of coding units divided from a current block wherein grouped coding units in each group of the plurality of groups of coding units having same prediction information; and means for decoding the current block based on the plurality of groups of coding units and the respective same prediction information.

According to another general aspect of at least one embodiment, a bitstream is presented, wherein the bitstream is formed by dividing a current block into a plurality of coding units; grouping the plurality of coding units into a plurality of groups of coding units wherein the grouped coding units in each group of the plurality of groups of coding units having same prediction information; and encoding the current block into the bitstream based on the plurality of groups of coding units and the respective same prediction information.

One or more of the present embodiments also provide a computer readable storage medium having stored thereon instructions for encoding or decoding video data in accordance with one or more aspects and/or embodiments described herein.

The present embodiments also provide a computer readable storage medium having stored thereon a bitstream generated in accordance with one or more aspects and/or embodiments described herein.

The present embodiments also provide a method and apparatus for transmitting the bitstream generated in accordance with one or more aspects and/or embodiments described herein.

The above presents a simplified summary of the subject matter in order to provide a basic understanding of some aspects of the present disclosure. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description provided below.

BRIEF DESCRIPTION OF THE DRAWINGS

The present disclosure may be better understood by consideration of the detailed description below in conjunction with the accompanying figures, in which:

FIG. 8 illustrates coding efficiency increase due to the use of a QTBT+ABT (Asymmetric Binary Tree) coding structure in the HEVC codec;

It should be understood that the drawings are for purposes of illustrating examples of various aspects and embodiments and are not necessarily the only possible configurations. Throughout the various figures, like reference designators refer to the same or similar features.

DETAILED DESCRIPTION

Figure 1:
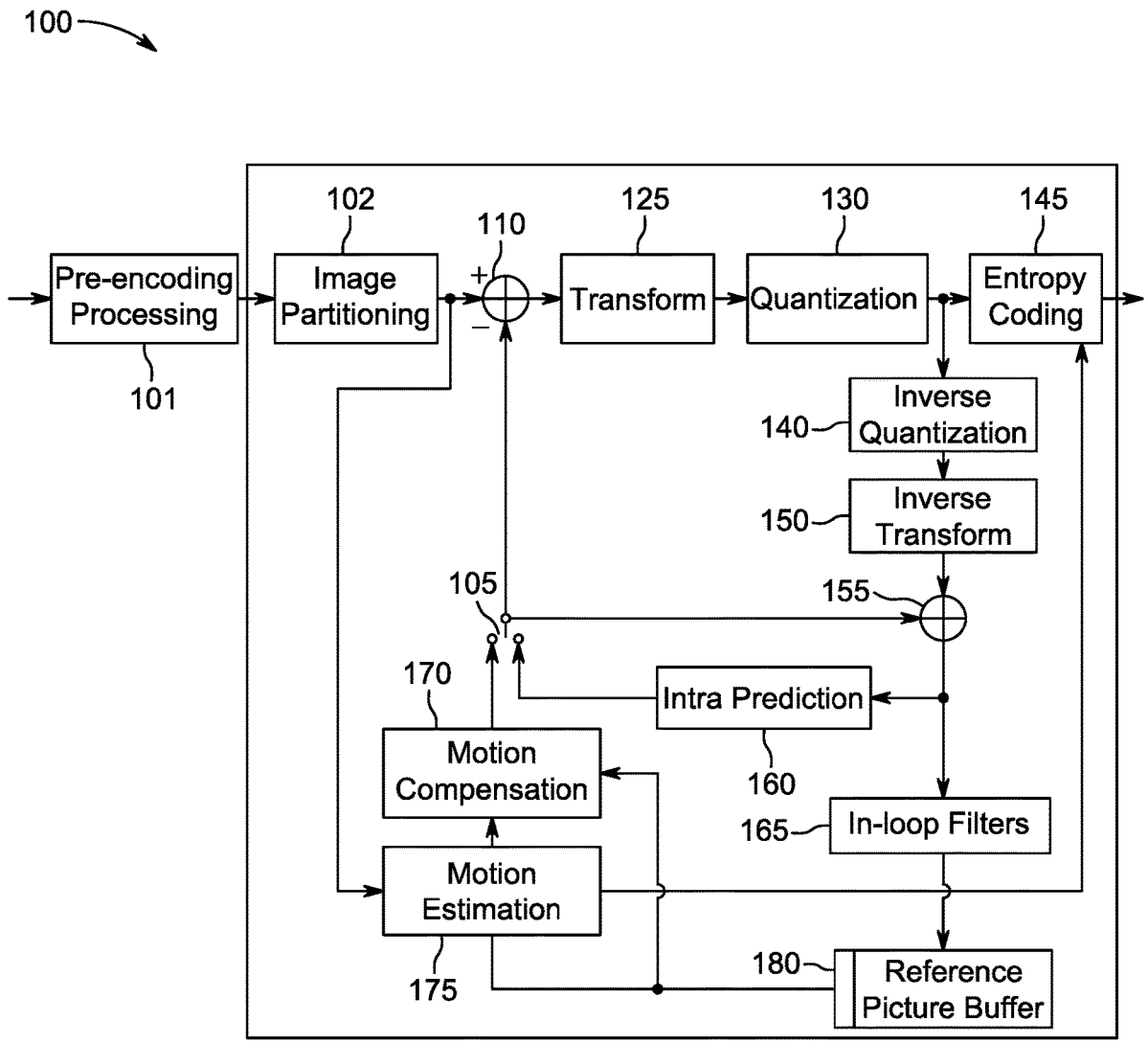
FIG. 1 illustrates a block diagram of an example of an embodiment of a video encoder.

Turning now to the figures, FIG. 1 illustrates an example of a video encoder 100, such as a High Efficiency Video Coding (HEVC) encoder. FIG. 1 may also illustrate an encoder in which improvements are made to the HEVC standard or an encoder employing technologies similar to HEVC, such as a JEM (Joint Exploration Model) encoder under development by JVET (Joint Video Exploration Team) as part of development of a new video coding standard known as Versatile Video Coding (VVC).

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding in HEVC, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU.

In JEM, the QTBT (Quadtree plus Binary Tree) structure removes the concept of multiple partition types in HEVC, i.e., removes the separation of CU, PU and TU concepts. A Coding Tree Unit (CTU) is first partitioned by a quadtree structure. The quadtree leaf nodes are further partitioned by a binary tree structure. The binary tree leaf node is named as Coding Units (CUs), which is used for prediction and transform without further partitioning. Thus, the CU, PU and TU have the same block size in the new coding QTBT block structure. In JEM, a CU consists of Coding Blocks (CBs) of different color components.

In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using two different options in HEVC. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

Current proposals in JEM increase the number of the intra prediction modes compared with HEVC. For example, JEM 3.0 uses 65 directional intra prediction modes in addition to the planar mode 0 and the DC mode 1. The directional intra prediction modes are numbered from 2 to 66 in the increasing order, in the same fashion as done in HEVC from 2 to 34. The 65 directional prediction modes include the 33 directional prediction modes specified in HEVC plus 32 additional directional prediction modes that correspond to angles in-between two original angles. In other words, the prediction direction in JEM has twice the angle resolution of HEVC. The higher number of prediction modes has been proposed to exploit the possibility of finer angular structures with proposed larger block sizes.

For an inter CU in HEVC, the corresponding coding block is further partitioned into one or more prediction blocks. Inter prediction is performed on the PB level, and the corresponding PU contains the information about how inter prediction is performed. The motion information (e.g., motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

The prediction residuals are then transformed (125) and quantized (130). The transforms are generally based on separable transforms. For instance, a DCT transform is first applied in the horizontal direction, then in the vertical direction. For HEVC, transform block sizes of 4×4, 8×8, 16×16, and 32×32 are supported. The elements of the core transform matrices were derived by approximating scaled discrete cosine transform (DCT) basis functions. The HEVC transforms are designed under considerations such as limiting the dynamic range for transform computation and maximizing the precision and closeness to orthogonality when the matrix entries are specified as integer values. For simplicity, only one integer matrix for the length of 32 points is specified, and subsampled versions are used for other sizes. For the transform block size of 4×4, an alternative integer transform derived from a discrete sine transform (DST) is applied to the luma residual blocks for intra prediction modes.

In JEM, the transforms used in both directions may differ (e.g., DCT in one direction, DST in the other one), which leads to a wide variety of 2D transforms, while in previous codecs, the variety of 2D transforms for a given block size is usually limited.

The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
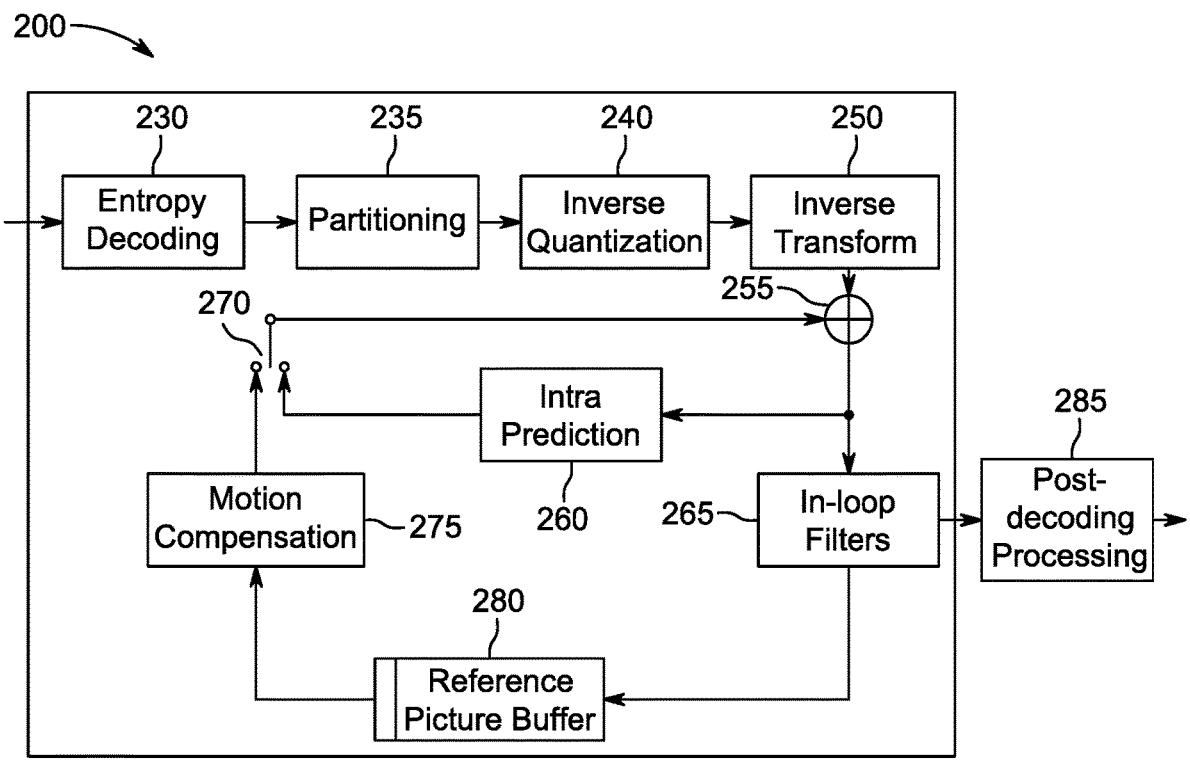
FIG. 2 illustrates a block diagram of an example of an embodiment of a video decoder.

FIG. 2 illustrates a block diagram of an exemplary video decoder 200, such as an HEVC decoder. In the exemplary decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a JEM decoder in VCC.

In particular, the input of the decoder includes a video bitstream, which may be generated by video encoder 100. The bitstream is first entropy decoded (230) to obtain transform coefficients, motion vectors, picture partitioning information, and other coded information. For HEVC, the picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. For JEM, the decoder may divide the picture based on the partitioning information indicating the QTBT structure. The transform coefficients are de-quantized (240) and inverse transformed (250) to decode the prediction residuals.

Combining (255) the decoded prediction residuals and the predicted block, an image block is reconstructed. The predicted block may be obtained (270) from intra prediction (260) or motion-compensated prediction (i.e., inter prediction) (275). As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing (285) may use metadata derived in the pre-encoding processing and signaled in the bitstream.

As described above, the present disclosure involves the field of video compression. In general, an aspect involves improving compression efficiency compared to existing video compression systems and another aspect involves providing various aspects and embodiments for representing luma and chroma coding trees and coding the luma and chroma compressed blocks, in a way that jointly ensures high coding efficiency, while taking into account some hardware decoding pipeline constraints.

Figure 3:
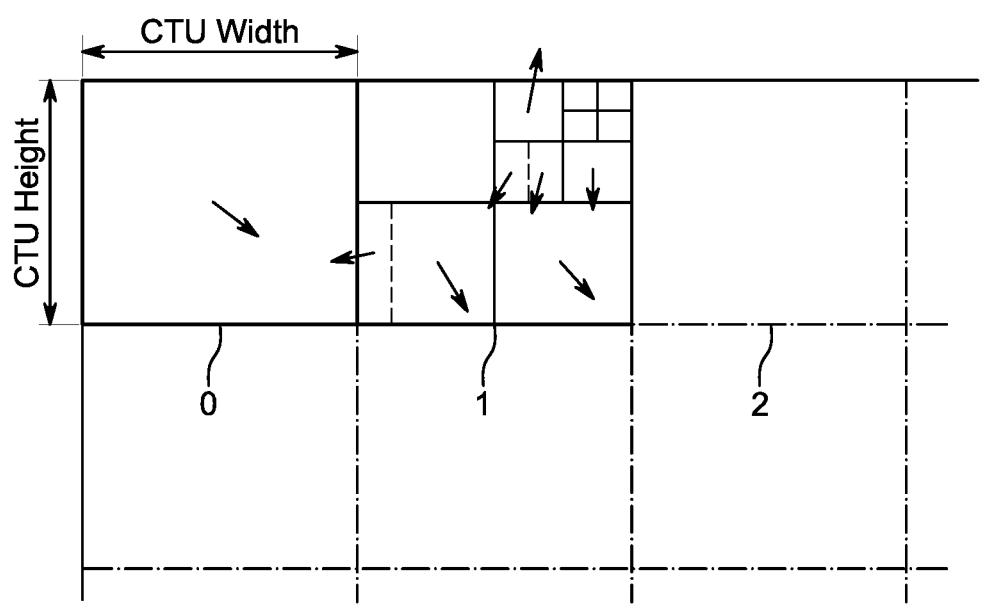
FIG. 3 illustrates Coding Tree Unit (CTU) and Coding Tree (CT) concepts to represent a compressed HEVC picture.
Figure 4:
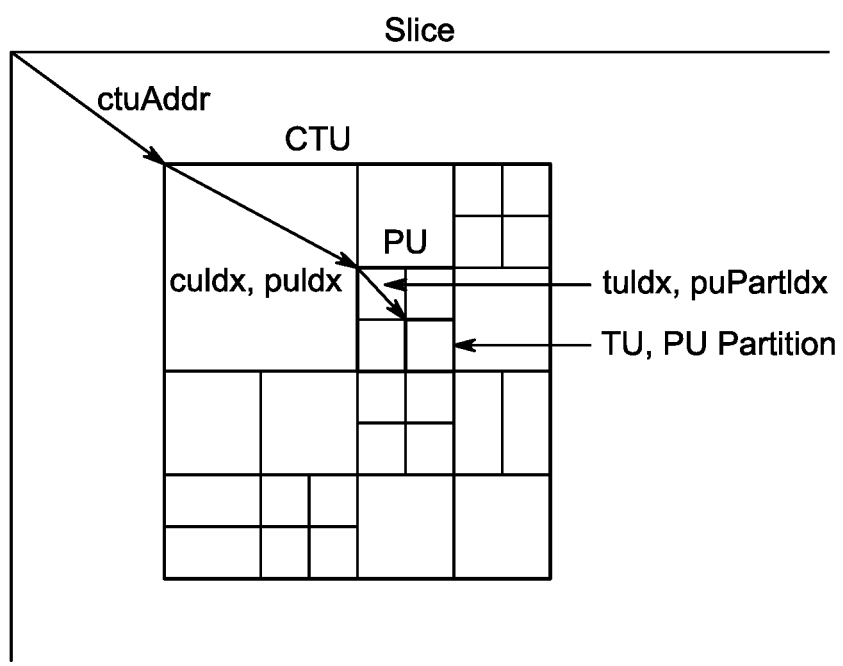
FIG. 4 illustrates division of a Coding Tree Unit (CTU) into Coding Units (CU), Prediction Units (PU) and Transform Units (TU)

In the HEVC video compression standard, a picture is divided into so-called Coding Tree Units (CTU), which size is typically 64×64, 128×128, or 256×256 pixels. Each CTU is represented by a Coding Tree in the compressed domain. This is a quad-tree division of the CTU, where each leaf is called a Coding Unit (CU), as illustrated in FIG. 3. Each CU is then given some Intra or Inter prediction parameters (Prediction Info). To do so, each CU is spatially partitioned into one or more Prediction Units (PUs), each PU being assigned some prediction information. The Intra or Inter coding mode is assigned on the CU level as illustrated in FIG. 4.

New emerging video compression tools include a Coding Tree Unit representation in the compressed domain in order to represent picture data in a more flexible way in the compressed domain. An advantage of this more flexible representation of the coding tree is that it provides increased compression efficiency compared to the CU/PU/TU arrangement of the HEVC standard.

Figure 5:
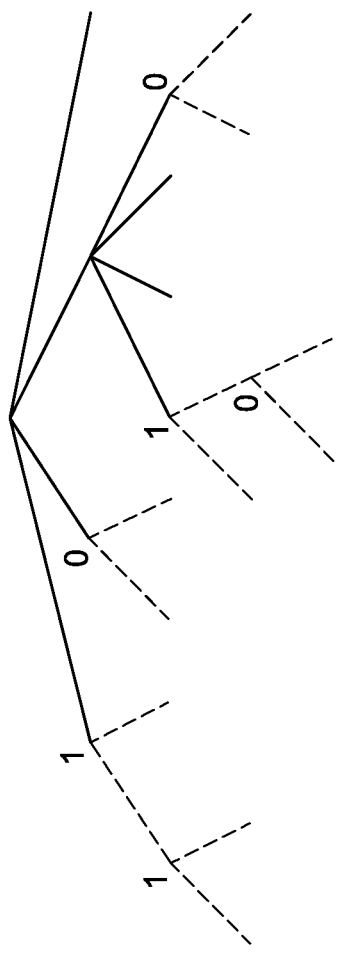
FIG. 5 illustrates Quad-Tree Plus Binary-Tree (QTBT) CTU representation.
Figure 5:
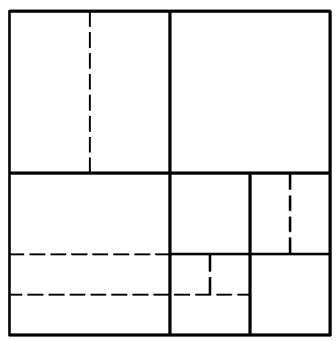

For example, the Quad-Tree plus Binary-Tree (QTBT) coding tool provides this increased flexibility. It involves a coding tree where coding units can be split both in a quad-tree and in a binary-tree fashion. An illustration of a QTBT type of coding tree representation of a Coding Tree Unit is illustrated in FIG. 5.

The splitting of a coding unit is decided on the encoder side, e.g., through a rate distortion optimization procedure which involves determining the QTBT representation of the CTU with minimal rate distortion cost.

In the QTBT technology, a CU has either a square or a rectangular shape. The size of a coding unit is typically a power of 2 in a range from 4 to 128.

In addition to this variety of rectangular shapes for a coding unit, this new CTU representation has characteristics such as the following that differ with respect to HEVC. The QTBT decomposition of a CTU is made of two stages: first the CTU is split in a quad-tree fashion, then each quad-tree leaf can be further divided in a binary fashion. This is illustrated on the right side of FIG. 5 where solid lines represent the quad-tree decomposition phase and dashed lines represent the binary decomposition that is spatially embedded in the quad-tree leaves.

In intra slices, the luma and chroma block partitioning structure is separated, and decided independently.

CU partitioning into predictions units or transform unit is no longer employed. In other words, each Coding Unit is systematically made of a single prediction unit (2N×2N prediction unit partition type) and single transform unit (no division into a transform tree).

Figure 6:
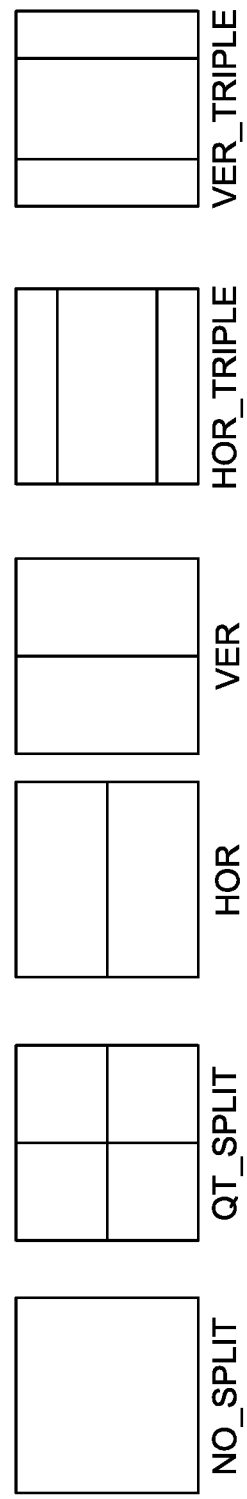
FIG. 6 illustrates an example of a set of CU partitions that may be used in an extended QTBT representation of a CTU.

Moreover, some other CU ternary tree partitioning may also be employed in the representation of the CTU's coding tree, e.g., in the VVC standard under development, as illustrated in FIG. 6. The CU partitions illustrated in FIG. 6 may be considered to provide an extended QTBT representation of a CTU. That is, a so-called triple-tree partitioning of a CU may be used, leading to the set of possible partitions illustrated in FIG. 6. Triple-tree partitioning involves splitting a CU into three sub-CUs with size ($\frac{1}{4}$, $\frac{1}{2}$, $\frac{1}{4}$) relative to the parent CU, in the considered orientation.

Figure 7:
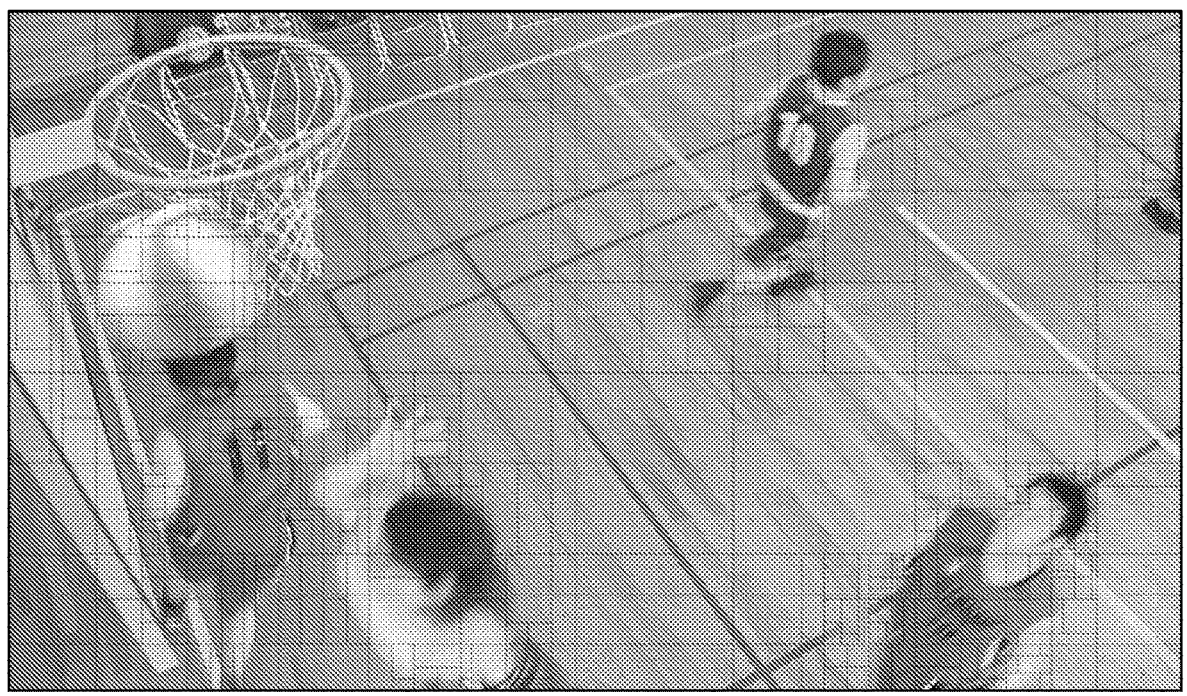
FIG. 7 illustrates an example of coding structures chosen to encode an example of a picture.

FIG. 7 shows an example of coding structures to encode a picture based on a typical block division of the picture by a video encoder that employs the split modes illustrated in FIG. 6. In FIG. 7, various squares indicated by the grid superimposed on the picture represent the Quad-Tree decomposition of CTUs and Symmetrical Binary-Tree and Triple Tree decompositions that are embedded into the quad-tree. Topologies such as those described above including a coding structure such as QTBT+TT (Ternary Tree) can provide a significant coding efficiency improvement as illustrated in FIG. 8 for the HEVC codec.

However, a codec architecture may no longer involve partitioning of a CU according to a transform tree as was the case in HEVC. An example of an approach to represent a coding tree of a CTU involving quad-tree splitting and the associated syntax (e.g., signal and/or bitstream) used to represent it is shown in Table 1 appended to this document.

Figure 9:
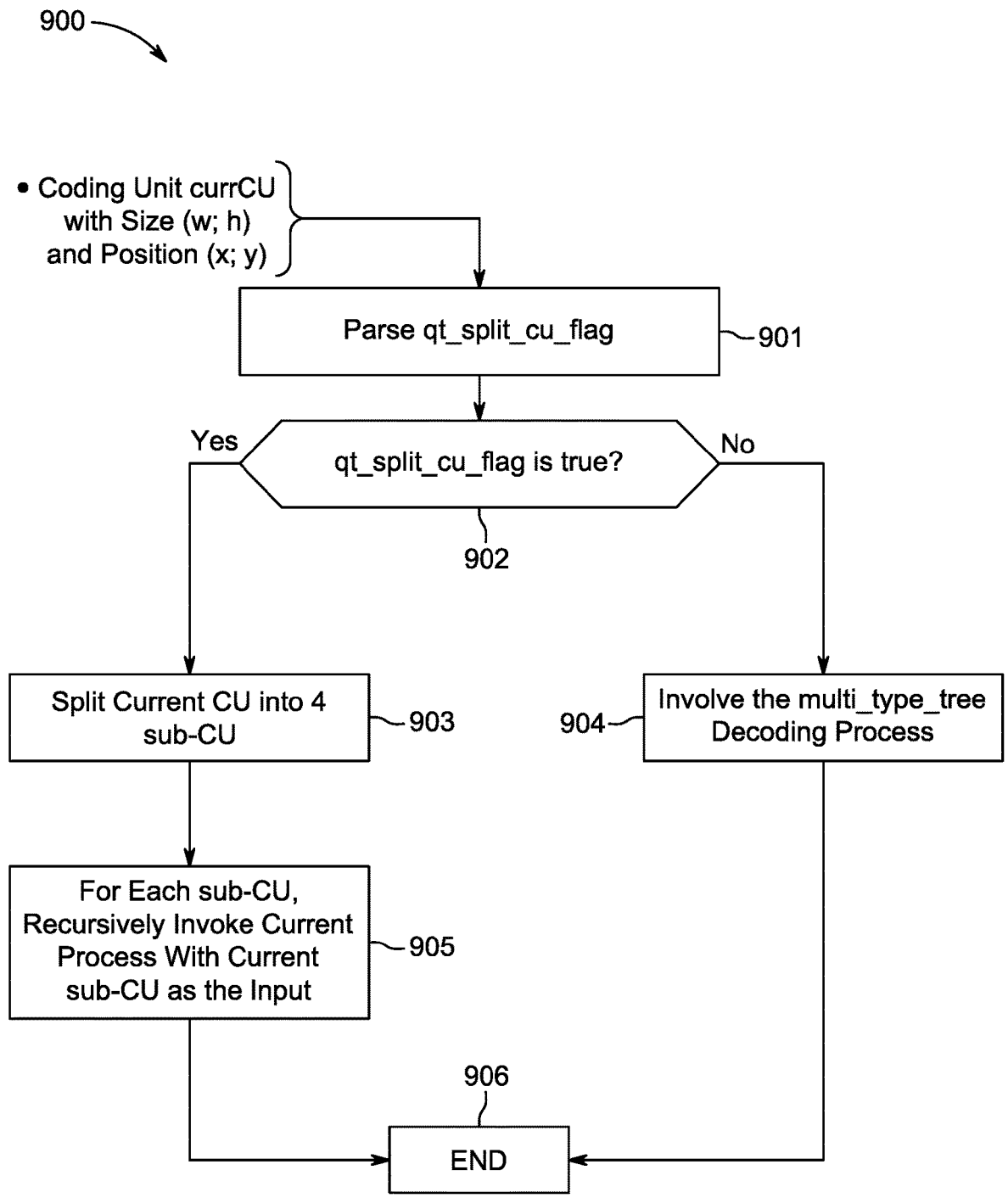
FIG. 9 illustrates a quad-tree split syntax decoding process as described herein.

FIG. 9 illustrates an example of a quad-tree split syntax decoding process 900 corresponding to the syntax of Table 1. As can be seen in FIG. 9 and Table 1, the example involves a coded flag qt_split_cu_flag which is parsed (901) and indicates if a current CU is split in a quad-tree fashion into four sub coding units (903). If so (yes at 902), then the coding quadtree syntax is recursively applied to each sub-CU issued from this quad-tree split (903). Otherwise (no at 902), the multi-type-tree syntax is used to signal the further recursive splitting of current CU in a ternary or binary fashion (904).

Figure 10:
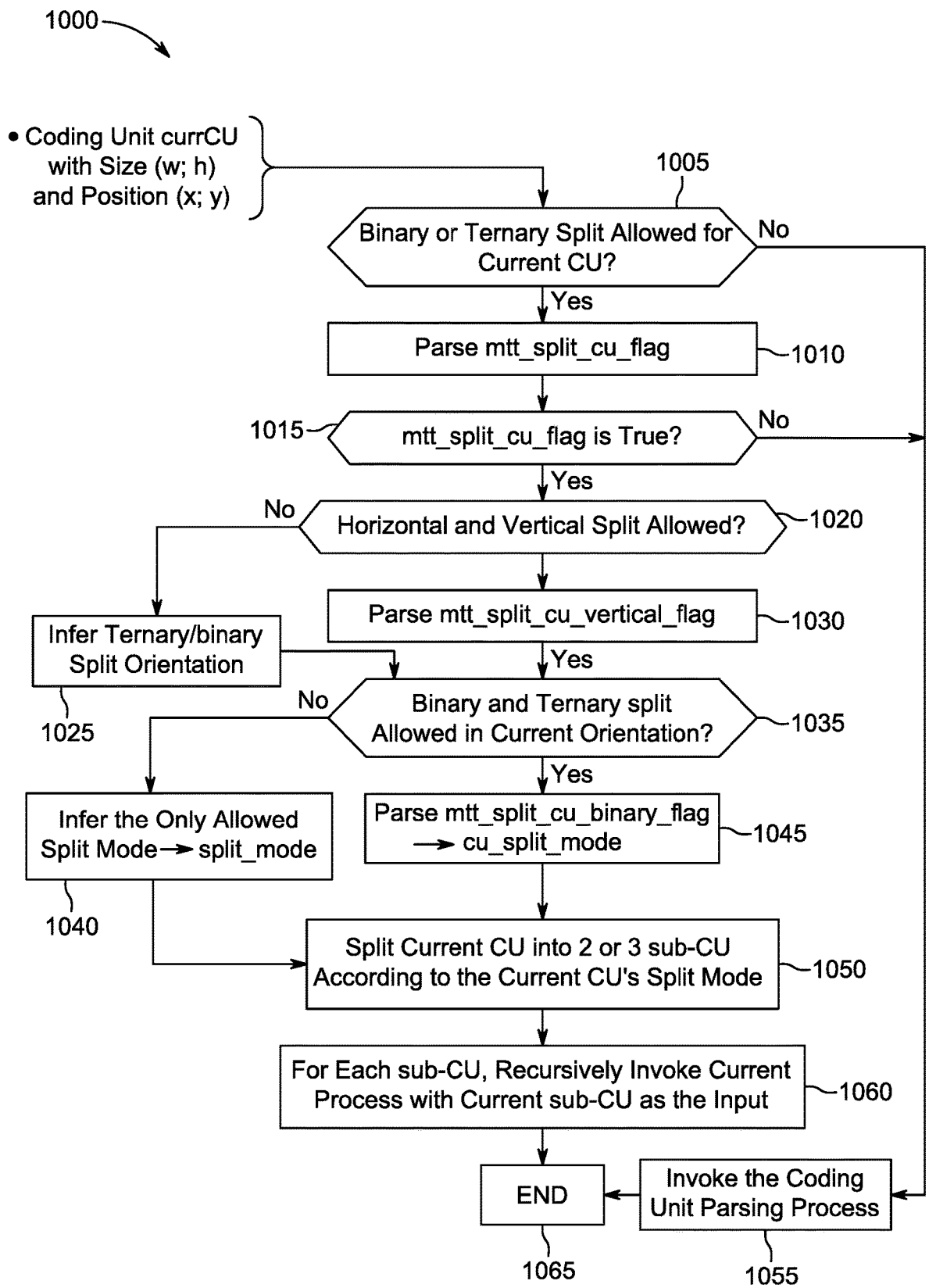
FIG. 10 illustrates an example of a decoding process of the multi-type-tree syntax as described herein.

An example of an approach to signaling ternary/binary splitting is shown by the syntax illustrated in Table 2 appended to this document. An example of a process 1000 to decoding of such multi-type-tree syntax is illustrated in FIG. 10. The example of multi-type-tree splitting syntax in FIG. 10 involves three flags. A first flag mtt_split_cu_flag is parsed (1010) and indicates if current CU is split in a binary or ternary way (1015). A second flag mttsplit_cu_vertical_flag is parsed (1030) and indicates the orientation (vertical or horizontal) of the ternary/binary split. A third flag mtt_split_cu_binary_flag is parsed (1045) and indicates the type of split, i.e., binary or ternary. If current CU is split in two or three sub-CUs, then the syntax of Table 2 is recursively applied onto each sub-CU of current CU.

An example of a decoding process for a multi-type-tree syntax such as that of the syntax example illustrated in Table 2 can follow the syntax arrangement of Table 2. The first steps involve parsing the split flag, and decoding the split mode of current CU. If the split mode is different from NO_SPLIT, then the CU is split according to its decoded split mode, and the process is invoked recursively on each results sub-CU. If the CU is not split, then the CU can be decoded and reconstructed according to the exemplary process 1100 illustrated in FIG. 11.

In general, an aspect of the present disclosure involves the splitting of a coding unit into sub-blocks which share one or more coding parameters, e.g., have the same prediction parameters, but are compressed and decompressed through a dedicated transform, residual coding, and post-filtering steps. In general, another aspect involves further improving the coding efficiency of a codec by allowing the further splitting of a given block into several transform blocks. In general, yet another aspect involves ensuring that the decoding process can be implemented with a decoding pipeline that proceeds on block by block basis where, e.g., a block size can be 64×64. This 64×64 block decoding unit is called a virtual pipeline decoding unit (VPDU). It is desirable that the decoder can proceed on VPDU basis, which means:

- all the compressed data corresponding to a given VPDU can be decoded in luma and chroma before starting to decode the next VPDU; and
- the bit-stream is organized so that all the Luma and Chroma compressed data related to a VPDU is packed together in the bit-stream.

In general, at least one embodiment in accordance with the present disclosure may involve one or more of various aspects and/or features and/or characteristics including, but not limited to:

- a flag on the coding tree level which indicates that all children CUs issued from current tree node share one or more coding parameters, e.g., having the same prediction data;
- if some coding parameters are shared by the CUs issued from a same tree node, then these shared parameters are coded in the first coding CU in that group, in decoder-side processing order;
- the flag may appear at the binary+ternary tree level in the overall coding tree of a CTU or may appear either at the quad-tree level or the binary/ternary tree level in the splitting hierarchy;
- in the case of separated luma/chroma coding trees, the flag applies only in the components which are concerned by the considered coding tree and, thus, grouping may happen in luma and not in the chroma CUs in same spatial area, or the reverse;
- the processing order on the decoder side may be adapted according to the VPDU constraint; and
- shared parameters can comprise transform related data, e.g., cu_mts_flag and mts_idx syntax elements, such that transform data can also be grouped between concerned CUs along with prediction data.

Another aspect can comprise a syntax associated with CU splitting that is compatible with other approaches, e.g., one or more of those contemplated by VVC.

Figure 12:
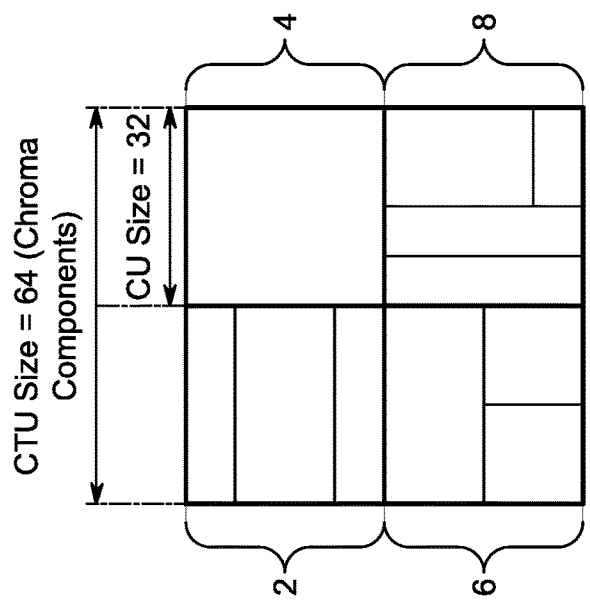
FIG. 12 through FIG. 17 illustrate various examples of aspects of at least one embodiment in accordance with the present disclosure.
Figure 12:
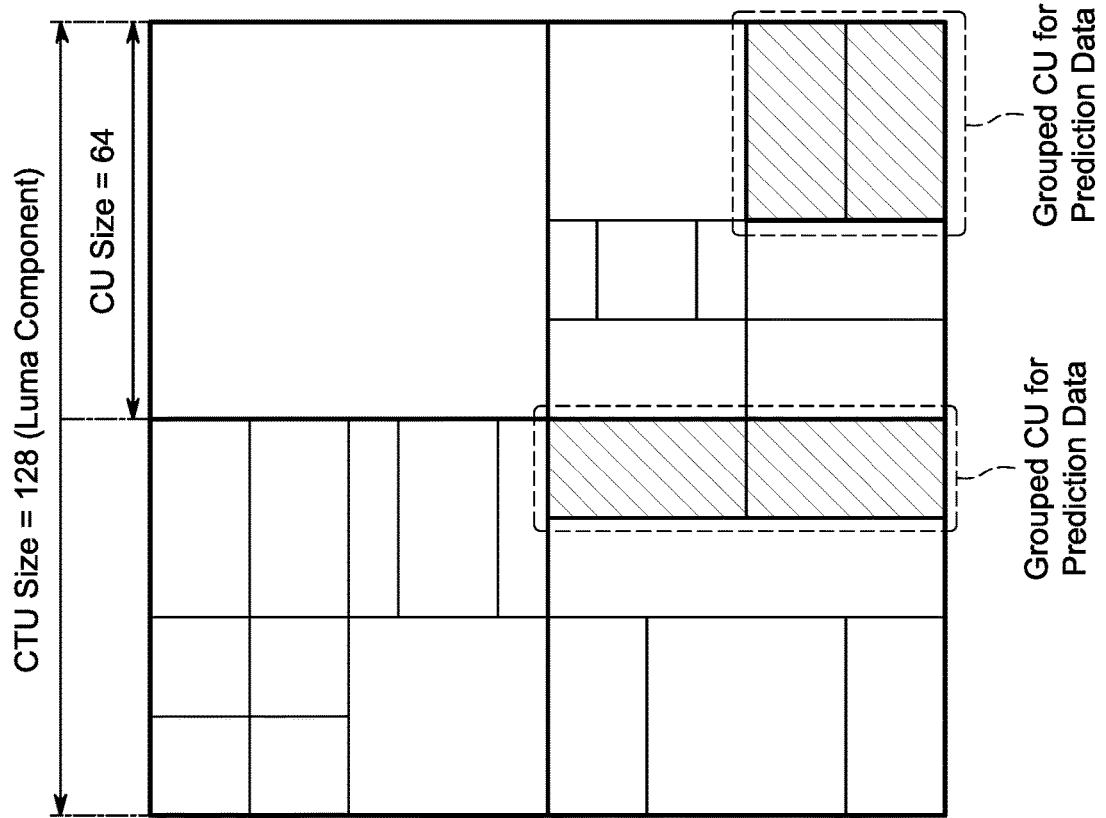
Figure 13:
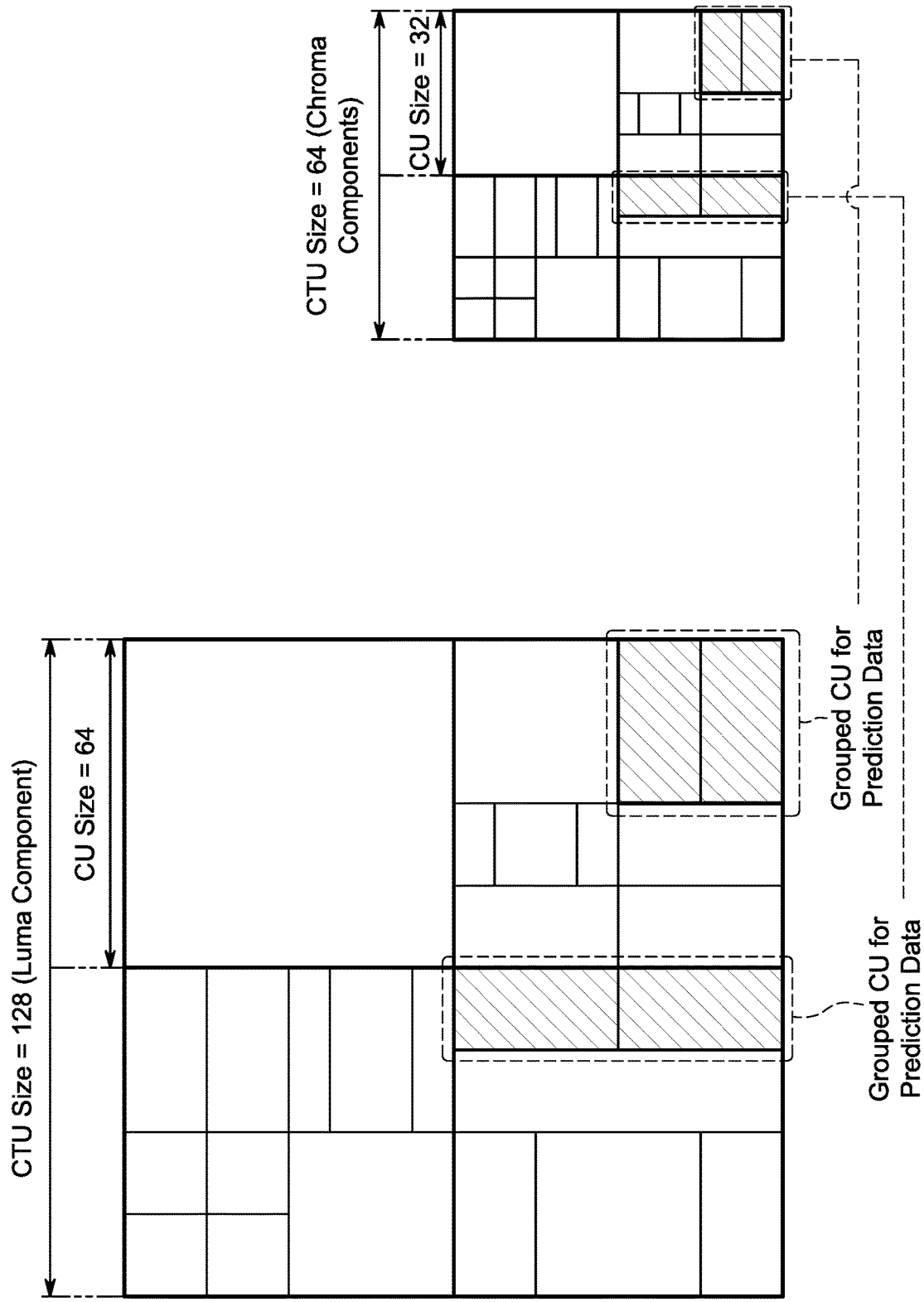

In general, an aspect of the present disclosure involves luma/chroma coding trees, and associated syntax and/or bit-stream organization. Examples of various embodiments are illustrated in FIGS. 12 and 13. These two figures illustrate examples of the block division of an exemplary CTU, respectively in luma and chroma components. In both examples, the considered CTU size is 128×128. The CUs for which the same prediction data are used are highlighted in grey color. In the first example shown in FIG. 12, the luma and chroma coding trees are separate and the example of grouping shown highlighted in grey is used only in the luma component of the considered CTU.

More specifically, FIGS. 12 and 13 illustrate examples of prediction data grouping among coding units. In FIG. 12, an example of a grouping of prediction data of several coding units is shown where these CUs are inside a common ancestor CU for a coding tree of an intra CTU in which the luma/chroma coding tree are separated. In contrast, the example shown in FIG. 13 illustrates an example of a non-Intra CTU where a single coding tree can be used for both luma and chroma. That is, as shown by grey shading in FIG. 13, the example of a grouping among plural coding units in the case of a non intra CTU for which a joint coding tree is used by luma and chroma components.

In general, at least one example of an embodiment can involve grouping the prediction data among plural CUs. In this first example, the prediction data syntax grouping is signaled on the CU level. For example, a flag can be introduced before the signaling of a coding unit that is not the first coding unit spatially contained in its parent CU. In that case, a flag such as grouped_prediction_data_flag indicates if the current CU is using the prediction of the preceding CU contained in the same parent CU, in decoder side processing order. Next, if the flag grouped_prediction_data_flag is false, then a typical or usual coding unit coding syntax can be used to code/decode current CU. Otherwise, a simplified "coding unit grouped_prediction data" syntax is used to code/decode current CU such as the example of syntax shown in Table 3. In Table 3 and other tables appended to this document, examples of embodiments of syntax in accordance with the present disclosure are illustrated by highlighting, or shading in grey, changes with respect to syntax such as that used in HEVC or proposed for VVC. The illustrated examples are not limiting in that the embodiments and/or features illustrated can apply to various technologies, environments or embodiments other than HEVC and VVC. Table 4 shows the difference between an example of typical or usual coding unit coding syntax and an example of an embodiment of syntax for the case of grouped prediction data. The difference as illustrated for the example of Table 4 includes discarding all syntax elements related to the prediction of the CU. Of the syntax associated with a usual or typical approach, only the syntax related to the transform and residual data coding is kept and is unchanged. According to a variant, only a pair of the prediction data is grouped among plural coding units.

Many variations of the first example of an embodiment just described are possible and are contemplated to be in accordance with the present disclosure. For example, one variant can involve at least one embodiment wherein the grouped_prediction_data_flag indicates if the current CU is using the prediction of the left neighboring CU of current CU, contained in the same parent CU. Another variant can involve at least one embodiment wherein the grouped_prediction_data_flag indicates if the current CU is using the prediction of the top neighboring CU of current CU, contained in the same parent CU. Another variant can involve at least one embodiment wherein the grouped_prediction_data_flag indicates if the current CU is using the prediction of the left neighboring CU of current CU if available and otherwise the top neighboring CU, contained in the same parent CU. Note if the current CU is not the first one in its parent CU, then either the top or the left neighboring CU of current CU is necessarily available.

Figure 14:
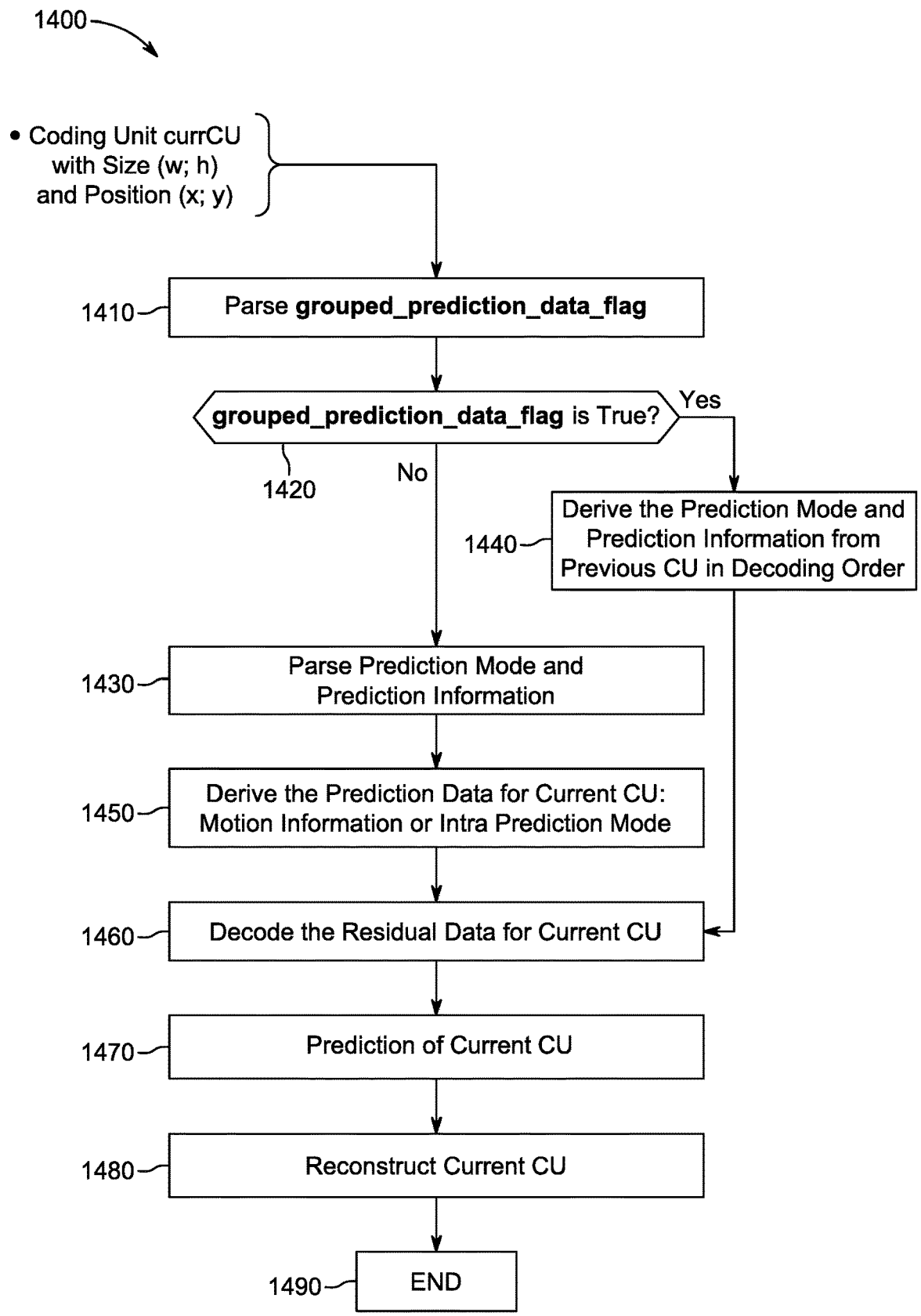

FIG. 14 depicts the CU decoding process 1400 corresponding to the previously described first example of an embodiment. The input to the process is the current CU to decode. The first step parses the grouped_prediction_data_flag syntax element (1410). If it is false (no at 1420), then the regular CU decoding takes place, involving prediction data parsing, prediction information derivation, residual block parsing and decoding, prediction of current CU, and reconstruction of current CU (1430). If the parsed flag grouped_prediction_data_flag is true (yes at 1420), then the prediction data of current CU is derived from the prediction data of previous CU in decoding order (1440). This derivation process comprises copying the prediction data from previous CU, in the case of intra mode or translational motion compensation mode.

In the case the previous CU was predicted through a sub-block-based motion information, the way the sub-block-based motion field was derived for previous CU is applied to current CU. In affine case, the control point motion vectors used for previous CU are used to propagate and derive the affine motion field of current CU. In case of ATMVP (Alternative Motion Vector Prediction), the temporal motion vector used to retrieve the motion information of previous CU is also used for current CU, to derive its own sub-block-based motion field.

Many variations of the described example of decoding are possible and are contemplated to be in accordance with the present disclosure. For example, one variant can involve the proposed prediction data grouping among plural CUs only being used in the case of intra and non-sub-block-based inter prediction. Another example of a variant can include the proposed prediction data grouping among plural CUs only being deactivated in the case of affine inter prediction.

In general, at least one other example of an embodiment for grouping the prediction data among plural CUs can comprise grouping the prediction among several sub-CUs on the ternary/binary coding tree level, rather than on the CU level. Table 5 and FIG. 15 respectively illustrate the proposed syntax and decoding process of this second example of an embodiment. As can be seen, the flag to signal the grouping of CUs prediction data is signaled in the case the current CU is split in to sub-CUs, and the flag has not been already signaled as true in a CU above in the coding tree.

Therefore, the variable parent_grouped_prediction_data indicates if one of the parent CU of current CU has been signaled with the grouped_prediction_data_flag equal to true or not. If it is false and the current CU is binary or ternary split, then the syntax element grouped_prediction_data_flag is coded. Moreover, the variable grouped_prediction_data is set to true if one of the parent_grouped_prediction_data and grouped_prediction_data_flag flags are equal to true, and is set to false otherwise. It is passed as an argument to the multi-type-tree syntax of sub-CUs results from the binary/ternary split of current CU.

Figure 15:
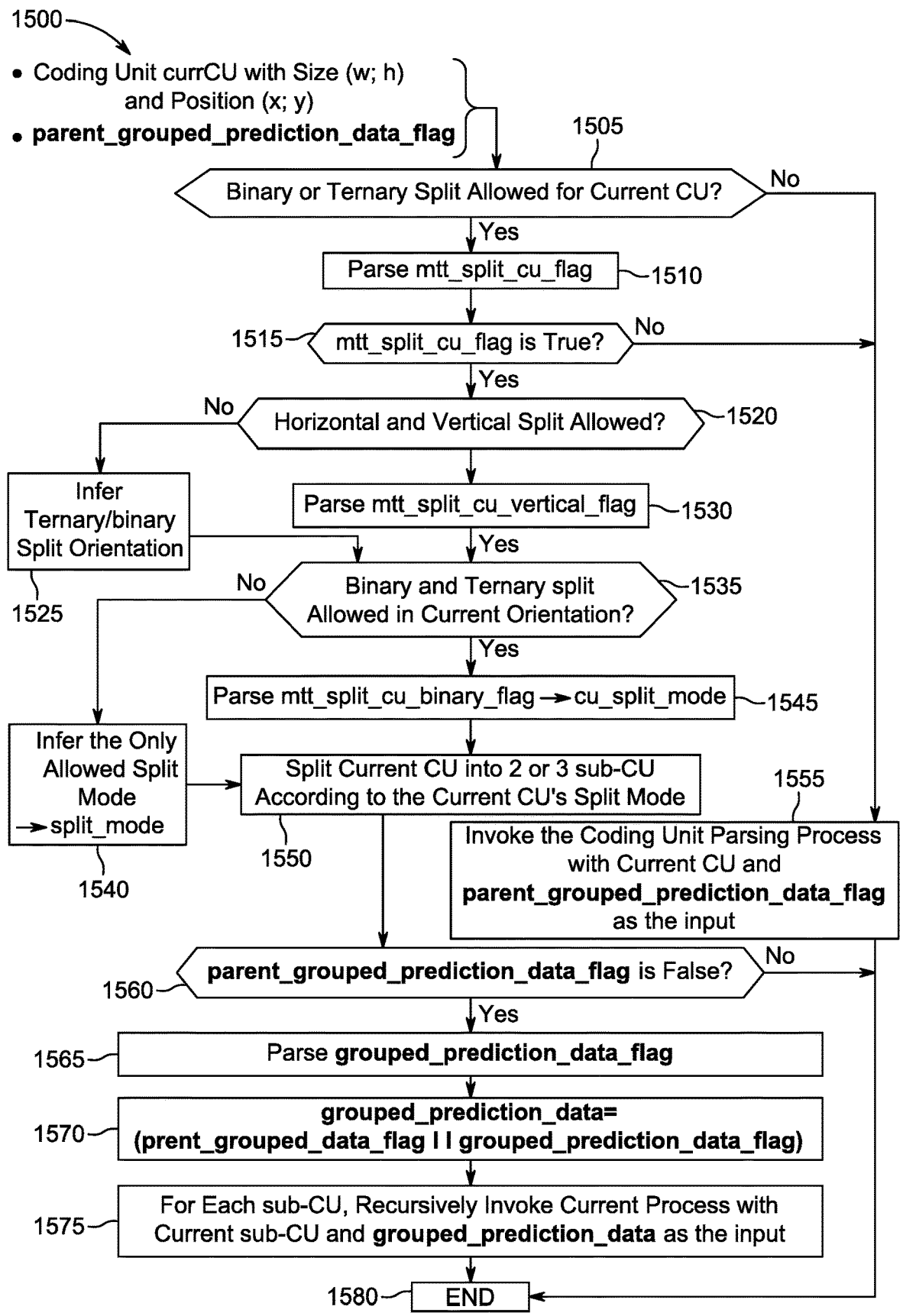

FIG. 15 illustrates an example of a decoding process 1500 corresponding to the second embodiment previously described and in accordance with the example of an embodiment of syntax shown in Table 5. The modifications to the initial multi-type-tree decoding process appear in bold. As can be seen, an aspect of the modification concerns the decoding of the grouped_prediction_data_flag syntax element on the multi-type-tree level (1560), and the passing of the grouped_prediction_data value (1565) to the recursive splitting process of current CU into sub-CUs (1575). Moreover, the non-split CU decoding process is invoked with the additional argument parent_grouped_prediciton_data_flag as an input (1555).

Figure 16:
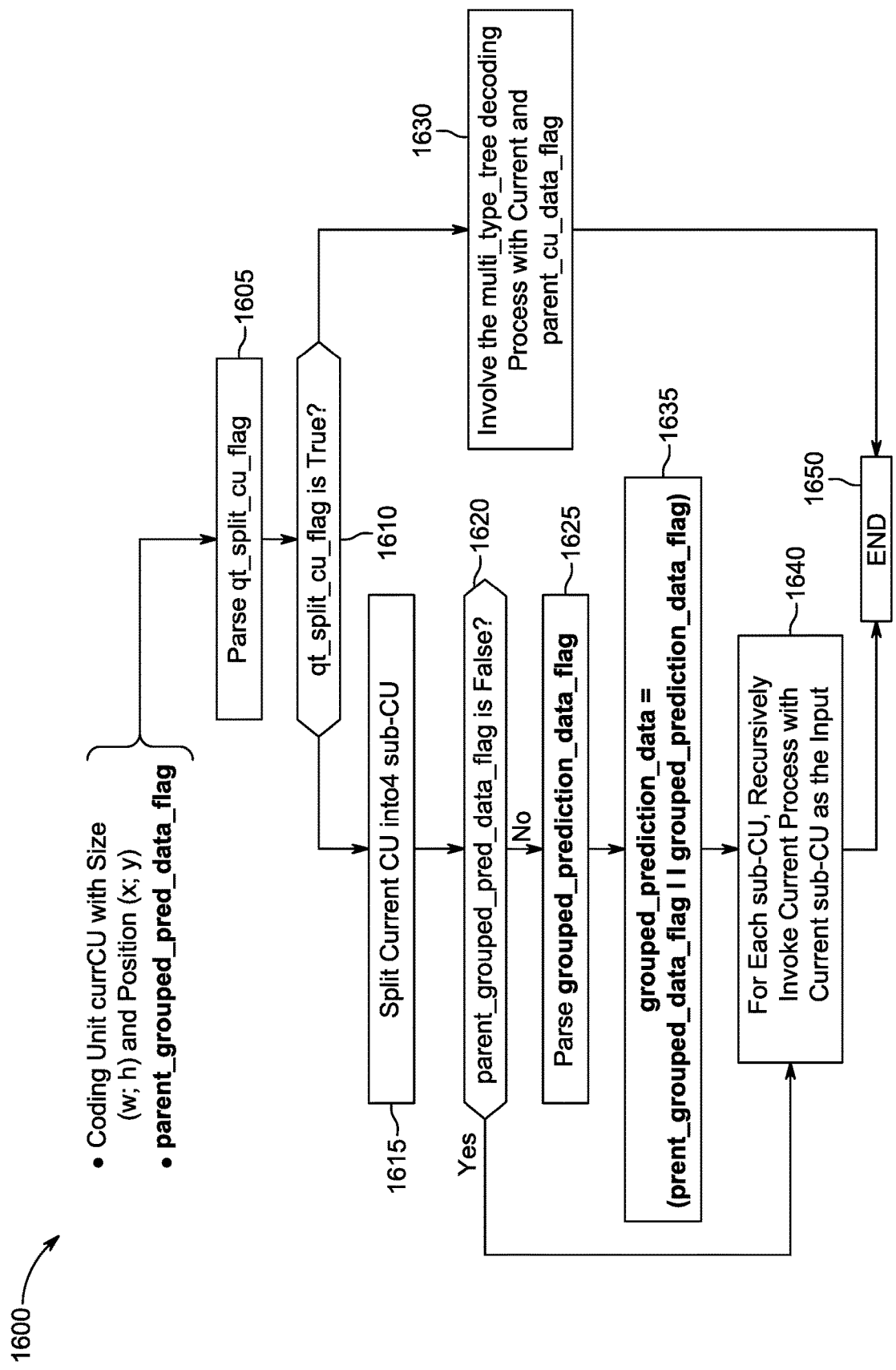

In general, at least one other example of an embodiment provides for quad-tree parsing and partitioning. This third example of an embodiment can be used in addition to the second example of an embodiment described above. Table 6 and FIG. 16 illustrate examples of quad-tree splitting syntax and decoding in accordance with the third example of an embodiment. This third embodiment can be analogous to the second embodiment described above in the case of a quad-tree split. As can be seen, an additional quad-tree level flag is added to the syntax is to be parsed and determined (1605; 1610). In addition, an additional argument parent_grouped_prediction data is used as the input. If it is false (yes at 1620), then the flag grouped_prediction_data_flag is signaled on the quad-tree level, in case current CU is split in a quad-tree way. Furthermore, the variable grouped_prediction_data, computed as shown in FIG. 16, is passed as an argument to the recursive call to the quad-tree syntax decoding process (1640).

Figure 11:
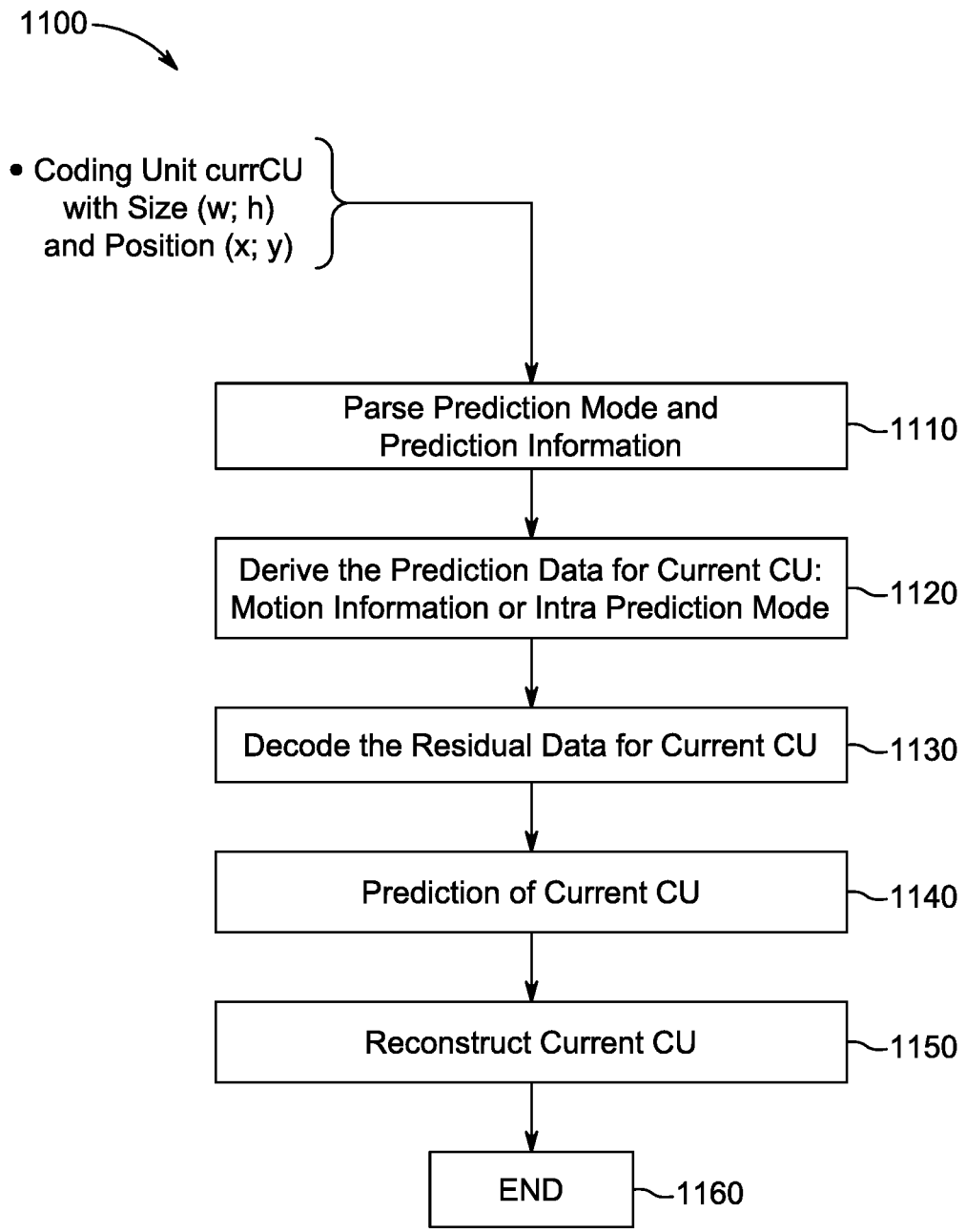
FIG. 11 illustrates an example of a process to decode and reconstruct a coding unit as described herein.
Figure 17:
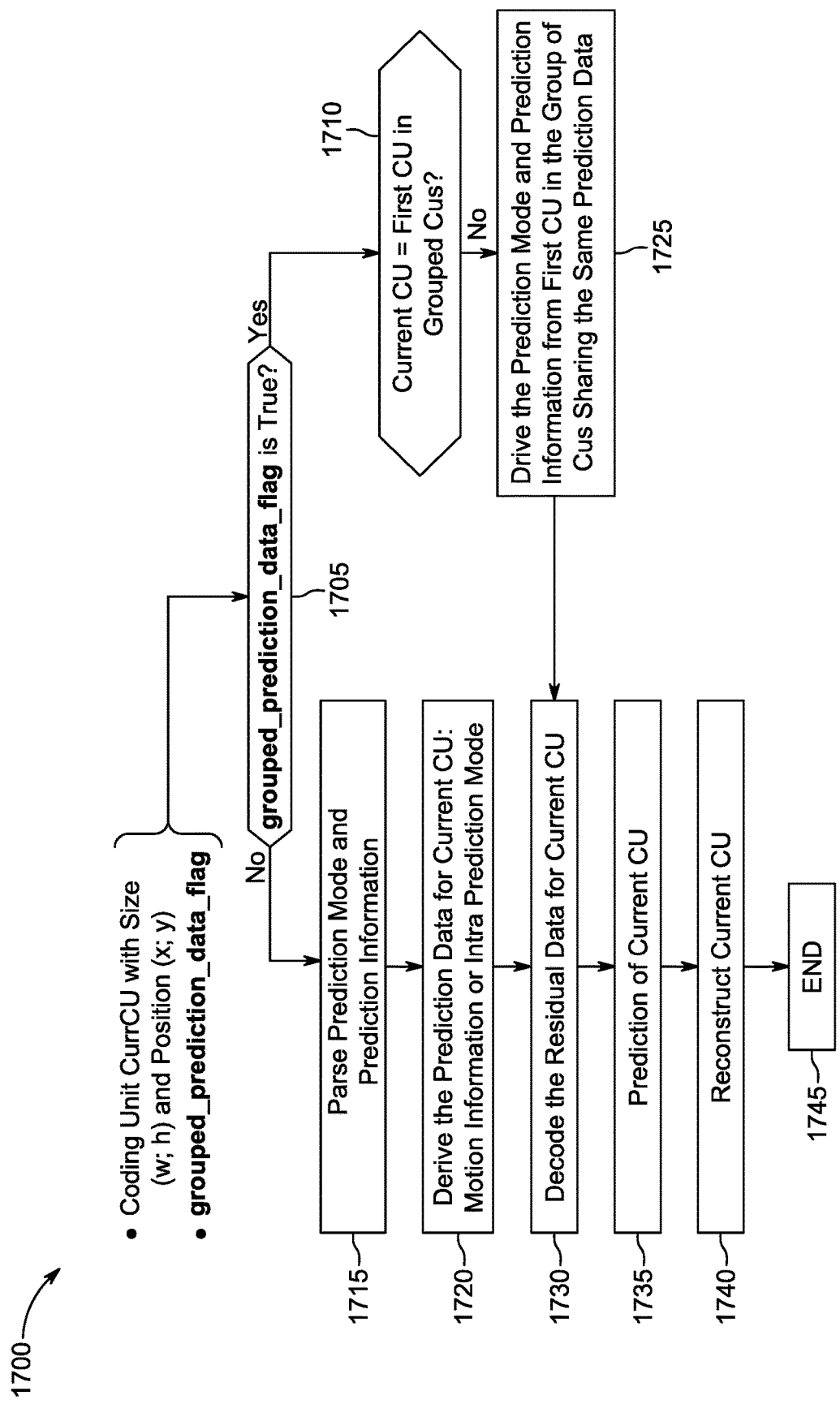

In general, an example of an embodiment of CU decoding process 1700 according to the second or third embodiments described above, or a combination of the second and third embodiments, is shown in FIG. 17. In the example of FIG. 17, modifications to the CU decoding process 1100 of FIG. 11 are shown in bold. These differences comprise testing the input grouped_prediction_data_flag value (1705), and, if true (yes at 1705) and if current CU is not the first one in the group of CUs sharing the same prediction data (no at 1710), in deriving the prediction data of current CU based on the first CU in the group of CUs sharing the same prediction data (1725). The first CU in that group is typically identified through a spatial address or coordinates (on a 4×4 block basis) and may be passed as an input argument to the CU decoding process of FIG. 17.

Figure 18:
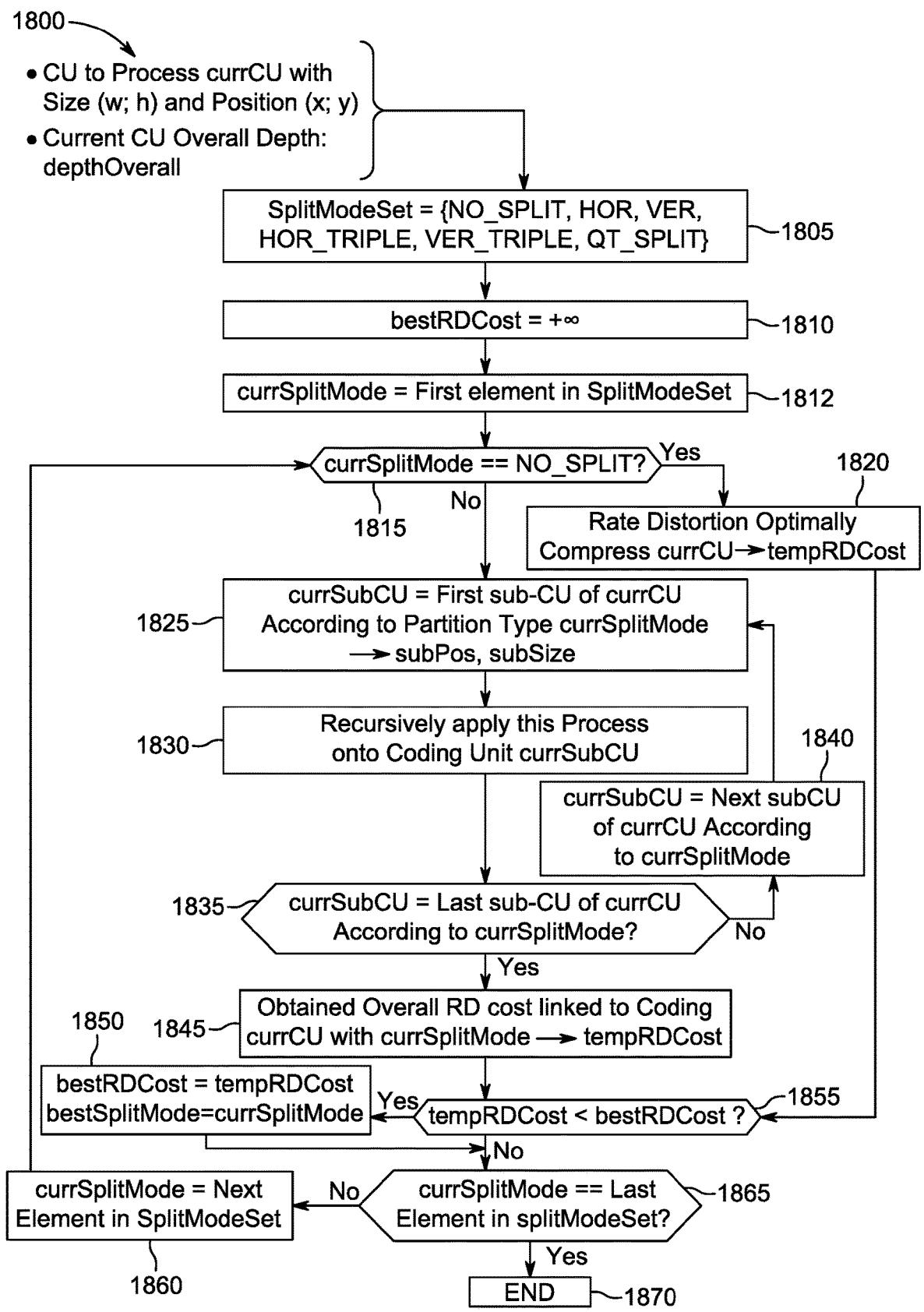
FIG. 18 illustrates an example of a rate distortion optimization process to choose the coding tree of a CTU.

An example of an approach to an encoder-side rate distortion optimization (RDO) process 1800 to jointly decide the coding trees and the prediction data grouping among plural CUs is illustrated in FIG. 18. The approach of FIG. 18 involves testing, for a given CU, all allowed split modes from among NO_SPLIT, quad-tree, binary and ternary split modes, and in choosing the split modes that give the lowest rate distortion cost. When testing a split mode different from NO_SPLIT, the current CU is split according to the tested split mode, and the process of FIG. 17 is invoked recursively on each sub-CU resulting from the split. In case of the NO_SPLIT mode, a rate distortion optimized choice of current CU's coding parameters takes place.

Figure 19:
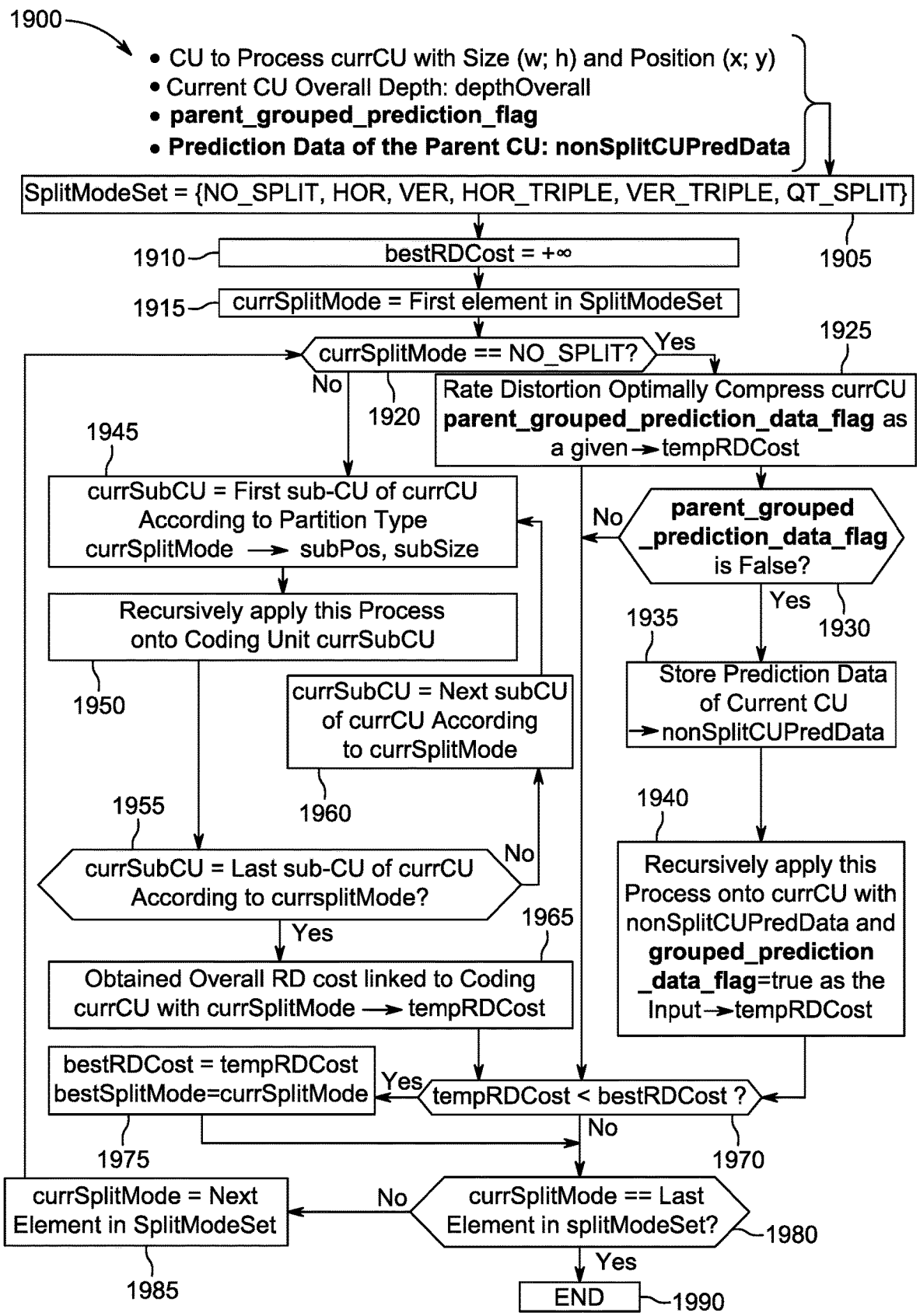
FIG. 19 illustrates another example of an aspect of at least one embodiment in accordance with the present disclosure.

In general, an aspect of at least one embodiment is illustrated in FIG. 19. In FIG. 19, an exemplary process 1900 of a modified coding tree decision through rate distortion optimization is illustrated which includes integrating the rate distortion optimized decision for prediction data grouping, e.g., as proposed in the second and/or third examples of embodiments described above.

In more detail, the example of an embodiment illustrated in FIG. 19 can comprise one or more modifications with respect to an approach such as that illustrated in FIG. 18. In FIG. 19, examples of such modifications are in bold (1925-1940). For example, two additional input arguments to the overall RDO process can be considered:

the parent_grouped_prediction_flag which is true if prediction data grouping is used in the coding tree part that contains current CU; and the prediction data that is being grouped among plural CUs. This represents the prediction data that is shared by plural CUs, including current CU if the flag parent_grouped_prediction_flag is true.

Also, for a CU being evaluated in NO_SPLIT mode, its prediction data can be stored for subsequent usage in the case where the picture area corresponding to current CU is tested in prediction data grouping mode (1935). Thus, this storing is followed by recursively apply the overall coding tree optimization process onto current CU (1940) in prediction data grouping mode. In this case, the prediction data that was found as optimal for the coding of current CU in NO_SPLIT mode is chosen as the prediction data that will be commonly used by multiple sub-CUs. This exemplary RDO process thus limits the amount of additional rate distortion search that needs to be done according to any of the second or third examples of embodiments described above or their combination.

In general, an aspect of at least one example of an embodiment can involve grouping transform type signaling syntax among plural CUs in addition to prediction data. That is, the grouping of information among CUs can also include the transform related data such as, for example, transform related data such as mts_flag and the mts_idx syntax elements, which are respectively part of the transform_unit syntax and residual_coding syntax. At least one example of an embodiment can include modifications proposed for these two syntaxes such as illustrated by Table 7 and Table 8 appended hereto.

An additional input to each of the examples of Tables 7 and 8 is the flag grouped_prediction_data, which indicates if the current transform unit (TU) is using some coding parameters issued from another transform unit. If it is true, then the cu_mts_flag is not coded/decoded. Instead, it is derived from the transform unit from which the current TU is re-using prediction data and transform unit parameters. In the same way, as shown by Table 8, the mts_idx syntax element is not coded or decoded and is inferred instead.

In general, at least one other example of an embodiment for transform type signaling can include, in the case of a CU grouped with some other CU, the cu_mts_flag is coded in a predictive way based on a preceding CU in the same group of CU sharing transform type information. As an example, the cu_mts_flag of the left or top CU of current CU in same group, when available, is used as a predictor of current CU's cu_mts_flag syntax element. Similarly, according to a further variant of this embodiment, the mts_idx syntax element of current CU is also predicted from surrounding CUs in same set of grouped CUs.

In general, at least one other example of an embodiment for transform type signaling can include, in the case of a CU grouped with some other CU, the cu_mts_flag is coded with a CABAC context that is chosen based on the cu_mts_flag of some preceding CU in the same set of grouped CUs sharing transform type information. As an example, depending on if the cu_mts_flag of the left and/or top CU of current in same group, when available, is used as a way to select the CABAC context used to code/decode the cu_mts_flag syntax element or current CU. Similarly, according to a further variant of this embodiment, the mts_idx syntax element of current CU is also coded with some CABAC context(s) which depend(s) on the value of the cu_mts_flag and mts_idx values of some top and/or left CU around the current CU, and in the same set of grouped CUs.

In general, at least one other example of an embodiment can include tu_cbf_luma and/or the tu_cbf_cb and tu_cbf_cr syntax elements of the current CU, in the case of a CU grouped with some other CU, being coded conditionally to the tu_cbf_luma and/or the tu_cbf_cb and tu_cbf_cr syntax elements of some other CU in the same set of grouped CUs. This can take the form of a prediction of these flags as a function of the corresponding flags in some other CU in the same set of grouped CUs. In another variant, these flags may be context-based coded, with associated contexts selected as a function of the corresponding flags values in some other CUs in the same set of grouped CUs.

In general, an aspect of at least one example of an embodiment can involve prediction data grouping accounting for a VPDU constraint on the decoding process. For example, an example of an embodiment can involve the application of a prediction data grouping mechanism to fulfill the constraint of a VPDU, typically of size 64×64 in luma (hence 32×32 in chroma). Examples of constraints that are to be fulfilled by the coding tree of a CTU to ensure the feasibility of the decoding with the 64×64 VPDU are the following ones:

Condition 1: For each VPDU containing one or multiple CUs, the CUs are completely contained in the VPDU.

Condition 2: For each CU containing one or more VPDUs, the VPDUs are completely contained in the CU.

For each CTU, the above two conditions shall not be violated, and the processing order of CUs shall not leave a VPDU and re-visit it later.

Figure 20:
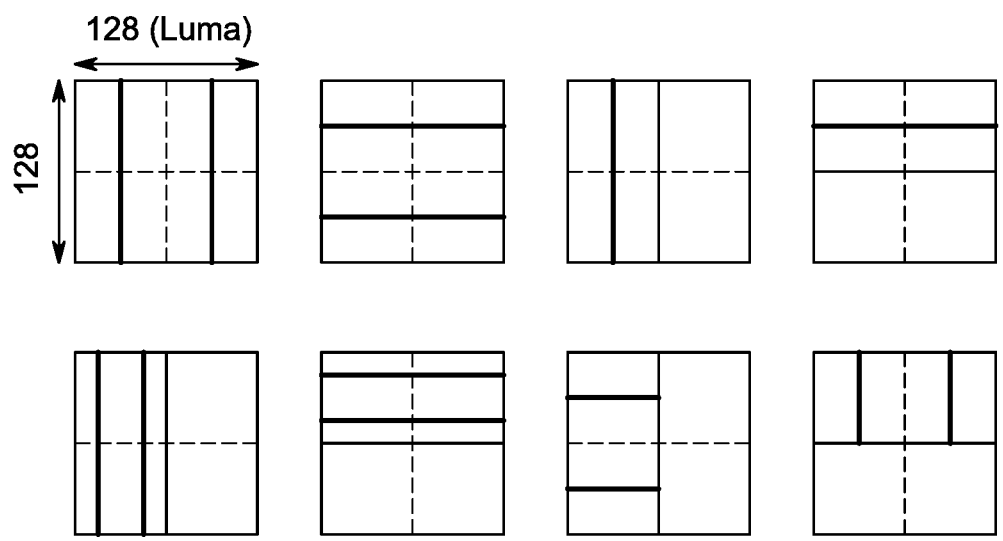
FIG. 20 illustrates various coding tree configurations with respect to a virtual pipeline decoding unit (VPDU)

Examples of coding tree configurations that can be problematic are illustrated in FIG. 20.

An approach to solving the VPDU constraint can involve placing some constraints on the allowed split modes such as:

for a 128×128 CTU, it shall not be partitioned by a TT split;

for a 128×N or N×128 CU, it shall not be partitioned by a TT split, where N≤64;

for a 128×N CU, horizontal BT cannot be applied, where N≤64;

for a N×128 CU, vertical BT cannot be applied, where N≤64.

However, such constraints can decrease the coding efficiency. For example, a 0.15% loss in compression efficiency can result from these constraints.

In general, at least one example of an embodiment can include one or more aspects that address the VPDU constraint such as the following two aspects:

the prediction (and optionally transform) data grouping method is applied to split a CU that overlaps two VPDU, to provide the possibility to share some prediction data, between blocks belonging to 2 different VPDUs;

the decoding order between CUs is adapted to respect the VPDU constraint on the processing order, which states that the processing order of CUs shall not leave a VPDU and re-visit it later. Therefore, the order in which Coding Units are decoded may change according to the configuration of the coding tree with respect to the VPDU grid.

Figure 21:
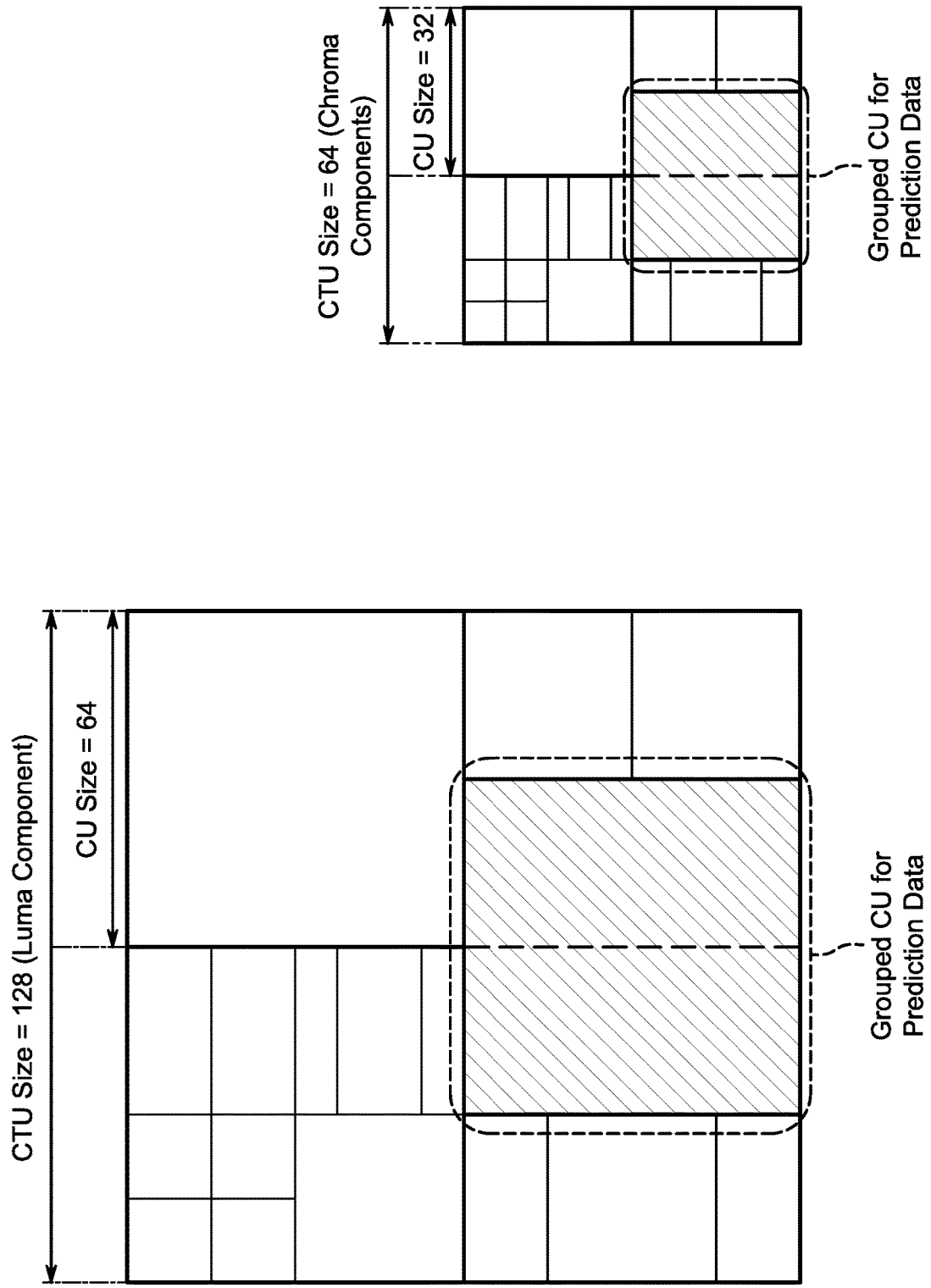
FIGS. 21 and 22 illustrate various examples of using a prediction data grouping in accordance with the present disclosure.
Figure 22:
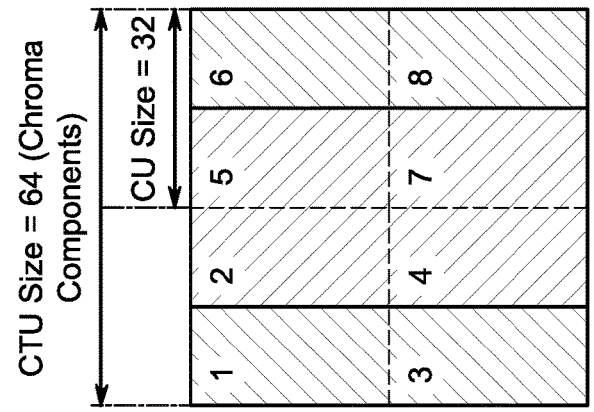
Figure 22:
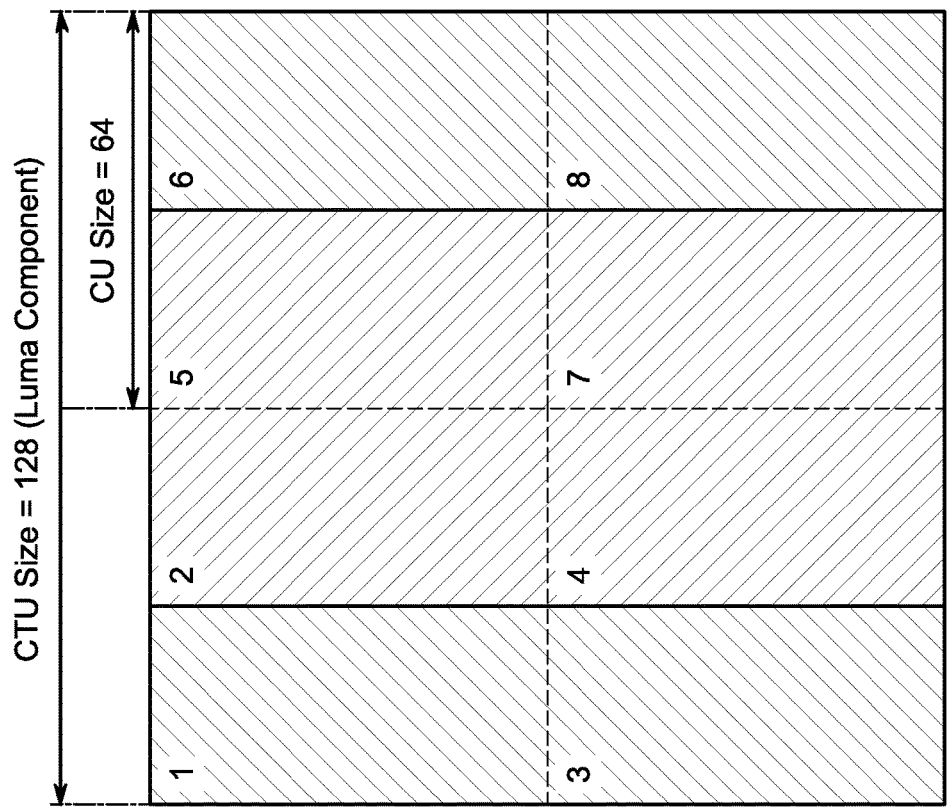

For example, in the example of FIG. 21, no change in the CU processing order is needed. On the contrary, in the example of FIG. 22, the processing of the CUs is changed. The middle CU is split into four sub-CU through two successive binary splits. The left and right CUs are split into two sub-CU through one binary split. This enables using the same prediction data for these whole areas, while splitting these areas into several Sub-CUs to respect the VPDU size. However, to respect the desired CU processing order, the scanning order indicated in FIG. 22 is used. In other words, the scanning order of CUs is such that all CUs contained inside a given VPDU are processed before starting to process a next VPDU.

Various methods are described above, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example, the number of intra prediction modes, or the number of transform subsets. It should be noted that the specific values are for exemplary purposes and the present embodiments are not limited to these specific values.

In the above, various embodiments are described with respect to HEVC, or JEM. For example, various examples of aspects and embodiments in accordance with the present disclosure may be used to modify the transform module (125) and/or one or both of the inverse transform modules (150) and (250) of the JEM or HEVC encoder and decoder examples shown in FIG. 1 and FIG. 2. However, the present embodiments are not limited to JEM or HEVC, and can be applied to other standards, recommendations, and extensions thereof.

Figure 23:
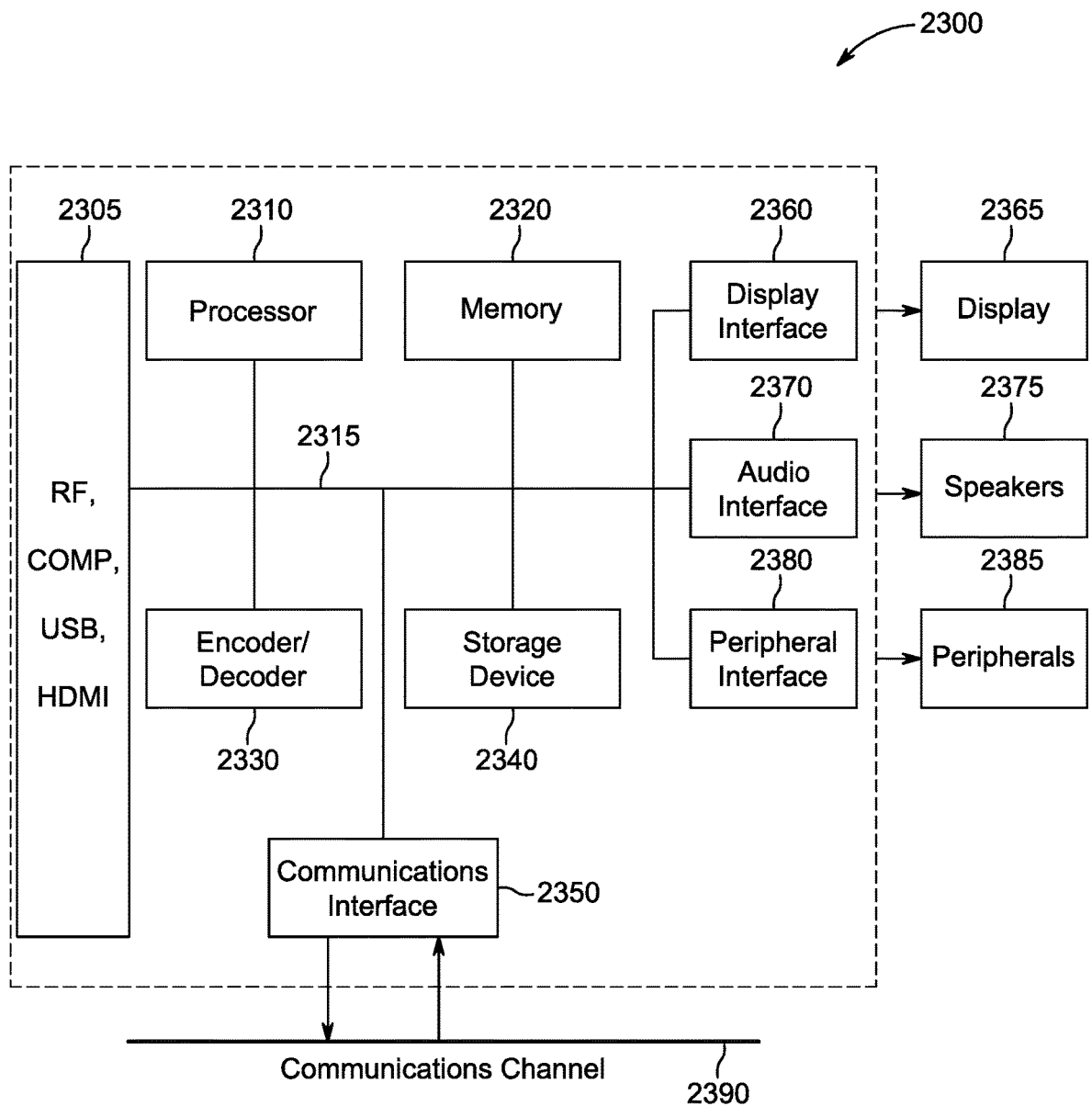
FIG. 23 illustrates a block diagram of an example of a system suitable for implementing one or more of various aspects, embodiments and features in accordance with the present disclosure.

FIG. 23 illustrates a block diagram of an example of a system 2300 in which various aspects and embodiments can be implemented. System 2300 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 2300, singly or in combination, can be embodied in a single integrated circuit, multiple ICs, and/or discrete components. For example, in at least one embodiment, the processing and encoder/decoder elements of system 2300 are distributed across multiple ICs and/or discrete components. In various embodiments, the system 2300 is communicatively coupled to other similar systems, or to other electronic devices, via, for example, a communications bus or through dedicated input and/or output ports. In various embodiments, the system 2300 is configured to implement one or more of the aspects described in this document.

The system 2300 includes at least one processor 2310 configured to execute instructions loaded therein for implementing, for example, the various aspects described in this document. Processor 2310 can include embedded memory, input output interface, and various other circuitries as known in the art. The system 2300 includes at least one memory 2320 (e.g., a volatile memory device, and/or a non-volatile memory device). System 2300 includes a storage device 2340, which can include non-volatile memory and/or volatile memory, including, but not limited to, EEPROM, ROM, PROM, RAM, DRAM, SRAM, flash, magnetic disk drive, and/or optical disk drive. The storage device 2340 can include an internal storage device, an attached storage device, and/or a network accessible storage device, as non-limiting examples.

System 2300 includes an encoder/decoder module 2330 configured, for example, to process data to provide an encoded video or decoded video, and the encoder/decoder module 2330 can include its own processor and memory. The encoder/decoder module 2330 represents module(s) that can be included in a device to perform the encoding and/or decoding functions. As is known, a device can include one or both of the encoding and decoding modules. Additionally, encoder/decoder module 2330 can be implemented as a separate element of system 2300 or can be incorporated within processor 2310 as a combination of hardware and software as known to those skilled in the art.

Program code to be loaded onto processor 2310 or encoder/decoder 2330 to perform the various aspects described in this document can be stored in storage device 2340 and subsequently loaded onto memory 2320 for execution by processor 2310. In accordance with various embodiments, one or more of processor 2310, memory 2320, storage device 2340, and encoder/decoder module 2330 can store one or more of various items during the performance of the processes described in this document. Such stored items can include, but are not limited to, the input video, the decoded video or portions of the decoded video, the bitstream or signal, matrices, variables, and intermediate or final results from the processing of equations, formulas, operations, and operational logic.

In several embodiments, memory inside of the processor 2310 and/or the encoder/decoder module 2330 is used to store instructions and to provide working memory for processing that is needed during encoding or decoding. In other embodiments, however, a memory external to the processing device (for example, the processing device can be either the processor 2310 or the encoder/decoder module 2330) is used for one or more of these functions. The external memory can be the memory 2320 and/or the storage device 2340, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 2300 can be provided through various input devices as indicated in block 2305. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 2305 have associated respective input processing elements as known in the art. For example, the RF portion can be associated with elements for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 2300 to other electronic devices across USB and/or HDMI connections. It is to be understood that various aspects of input processing, for example, Reed-Solomon error correction, can be implemented, for example, within a separate input processing IC or within processor 2310. Similarly, aspects of USB or HDMI interface processing can be implemented within separate interface ICs or within processor 2310. The demodulated, error corrected, and demultiplexed stream is provided to various processing elements, including, for example, processor 2310, and encoder/decoder 2330 operating in combination with the memory and storage elements to process the datastream for presentation on an output device.

Various elements of system 2300 can be provided within an integrated housing, Within the integrated housing, the various elements can be interconnected and transmit data therebetween using suitable connection arrangement 2315, for example, an internal bus as known in the art, including the I2C bus, wiring, and printed circuit boards.

The system 2300 includes communication interface 2350 that enables communication with other devices via communication channel 2390. The communication interface 2350 can include, but is not limited to, a transceiver configured to transmit and to receive data over communication channel 2390. The communication interface 2350 can include, but is not limited to, a modem or network card and the communication channel 2390 can be implemented, for example, within a wired and/or a wireless medium.

Data are streamed to the system 2300, in various embodiments, using a Wi-Fi network such as IEEE 802.11. The Wi-Fi signal of these embodiments is received over the communications channel 2390 and the communications interface 2350 which are adapted for Wi-Fi communications. The communications channel 2390 of these embodiments is typically connected to an access point or router that provides access to outside networks including the Internet for allowing streaming applications and other over-the-top communications. Other embodiments provide streamed data to the system 2300 using a set-top box that delivers the data over the HDMI connection of the input block 2305. Still other embodiments provide streamed data to the system 2300 using the RF connection of the input block 2305.

The system 2300 can provide an output signal to various output devices, including a display 2365, speakers 2375, and other peripheral devices 2385. The other peripheral devices 2385 include, in various examples of embodiments, one or more of a stand-alone DVR, a disk player, a stereo system, a lighting system, and other devices that provide a function based on the output of the system 2300. In various embodiments, control signals are communicated between the system 2300 and the display 2365, speakers 2375, or other peripheral devices 2385 using signaling such as AV.Link, CEC, or other communications protocols that enable device-to-device control with or without user intervention. The output devices can be communicatively coupled to system 2300 via dedicated connections through respective interfaces 2360, 2370, and 2380. Alternatively, the output devices can be connected to system 2300 using the communications channel 2390 via the communications interface 2350. The display 2365 and speakers 2375 can be integrated in a single unit with the other components of system 2300 in an electronic device, for example, a television. In various embodiments, the display interface 2360 includes a display driver, for example, a timing controller (T Con) chip.

The display 2365 and speaker 2375 can alternatively be separate from one or more of the other components, for example, if the RF portion of input 2305 is part of a separate set-top box. In various embodiments in which the display 2365 and speakers 2375 are external components, the output signal can be provided via dedicated output connections, including, for example, HDMI ports, USB ports, or COMP outputs.

The embodiments can be carried out by computer software implemented by the processor 2310 or by hardware, or by a combination of hardware and software. As a non-limiting example, the embodiments can be implemented by one or more integrated circuits. The memory 2320 can be of any type appropriate to the technical environment and can be implemented using any appropriate data storage technology, such as optical memory devices, magnetic memory devices, semiconductor-based memory devices, fixed memory, and removable memory, as non-limiting examples. The processor 2310 can be of any type appropriate to the technical environment, and can encompass one or more of microprocessors, general purpose computers, special purpose computers, and processors based on a multi-core architecture, as non-limiting examples.

Throughout this disclosure, various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting a picture from a tiled (packed) picture, determining an upsample filter to use and then upsampling a picture, and flipping a picture back to its intended orientation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Also, various implementations involve encoding. In an analogous way to the above discussion about "decoding", "encoding" as used in this application can encompass all or part of the processes performed, for example, on an input video sequence in order to produce an encoded bitstream or signal. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches can be based on an extensive testing of all encoding options, including all considered modes or coding parameters values, with a complete evaluation of their coding cost and related distortion of the reconstructed signal after coding and decoding. Faster approaches can also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "obtaining" various pieces of information. Obtaining the information can include one or more of, for example, determining the information, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for refinement. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream or signal of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various generalized as well as particularized embodiments are also supported and contemplated throughout this disclosure. Examples of embodiments in accordance with the present disclosure include but are not limited to the following.

In general, at least one example of an embodiment can involve apparatus for video encoding, comprising: one or more processors, wherein the one or more processors are configured to divide a current block into a plurality of coding units; group two or more of the plurality of coding units into at least one group of coding units wherein the two or more of the plurality of coding units in the at least one group of coding units share at least one coding parameter; and encode the current block based on the at least one group of coding units and the at least one shared coding parameter.

In general, at least one example of an embodiment can involve apparatus for video decoding, comprising: one or more processors, wherein the one or more processors are configured to obtain at least one group of coding units including two or more of a plurality of coding units divided from a current block wherein the two or more of the plurality of coding units share at least one coding parameter; and decode the current block based on the at least one group of coding units and the at least one shared coding parameter.

In general, at least one example of an embodiment can involve a method for video encoding, comprising: dividing a current block into a plurality of coding units; grouping two or more of the plurality of coding units into at least one group of coding units wherein the two or more of the plurality of coding units in the at least one group of coding units share at least one coding parameter; and encoding the current block based on the at least one group of coding units and the at least one shared coding parameter.

In general, at least one example of an embodiment can involve a method for video decoding, comprising: obtaining at least one group of coding units including two or more of a plurality of coding units divided from a current block wherein the two or more of the plurality of coding units share at least one coding parameter; and decoding the current block based on the at least one group of coding units and the at least one shared coding parameter.

In general, at least one example of an embodiment can involve apparatus for video encoding, comprising one or more processors, wherein the one or more processors are configured to: divide a current block into a plurality of coding units; group the plurality of coding units into a plurality of groups of coding units wherein the grouped coding units in each group of the plurality of groups of coding units have the same prediction information; and encode the current block based on the plurality of groups of coding units and the respective same prediction information.

In general, at least one example of an embodiment can involve apparatus for video decoding, comprising one or more processors, wherein the one or more processors are configured to: obtain a plurality of groups of coding units corresponding to a plurality of coding units divided from a current block wherein grouped coding units in each group of the plurality of grouped coding units have the same prediction information; and decode the current block based on the plurality of groups of coding units and the respective same prediction information.

In general, at least one example of an embodiment can involve a method for video encoding, comprising: dividing a current block into a plurality of coding units; grouping the plurality of coding units into a plurality of groups of coding units wherein the grouped coding units in each group of the plurality of groups of coding units have the same prediction information; and encoding the current block based on the plurality of groups of coding units and the respective same prediction information.

In general, at least one example of an embodiment can involve a method for video decoding, comprising: obtaining a plurality of groups of coding units corresponding to a plurality of coding units divided from a current block wherein grouped coding units in each group of the plurality of groups of coding units have the same prediction information; and decoding the current block based on the plurality of groups of coding units and the respective same prediction information.

In general, at least one example of an embodiment can involve an apparatus or a method as described herein, wherein at least one of a plurality of groups of coding units overlaps at least two different pipeline units associated with a pipelined decoding operation.

In general, at least one example of an embodiment can involve apparatus for video encoding, comprising: one or more processors, wherein the one or more processors are configured to divide a current block into a plurality of coding units; group two or more of the plurality of coding units into at least one group of coding units wherein the two or more of the plurality of coding units in the at least one group of coding units share at least one coding parameter, and the at least one group of coding units overlaps at least two different pipeline units associated with a pipelined decoding operation; and encode the current block based on the at least one group of coding units and the at least one shared coding parameter.

In general, at least one example of an embodiment can involve an apparatus for video decoding, comprising: one or more processors, wherein the one or more processors are configured to obtain at least one group of coding units including two or more of a plurality of coding units divided from a current block wherein the two or more of the plurality of coding units share at least one coding parameter, and the at least one group of coding units overlaps at least two different pipeline units associated with a pipelined decoding operation; and decode the current block based on the pipelined decoding operation, the at least one group of coding units and the at least one shared coding parameter.

In general, at least one example of an embodiment can involve a method for video encoding, comprising: dividing a current block into a plurality of coding units; grouping two or more of the plurality of coding units into at least one group of coding units wherein the two or more of the plurality of coding units in the at least one group of coding units share at least one coding parameter, and the at least one group of coding units overlaps at least two different pipeline units associated with a pipelined decoding operation; and encoding the current block based on the at least one group of coding units and the at least one shared coding parameter.

In general, at least one example of an embodiment can involve a method for video decoding, comprising: obtaining at least one group of coding units including two or more of a plurality of coding units divided from a current block wherein the two or more of the plurality of coding units share at least one coding parameter, and the at least one group of coding units overlaps at least two different pipeline units associated with a pipelined decoding operation; and decoding the current block based on the pipelined decoding operation, the at least one group of coding units, and the at least one shared coding parameter.

In general, at least one example of an embodiment can involve a bitstream, wherein the bitstream is formed by: dividing a current block into a plurality of coding units; grouping two or more of the plurality of coding units into a group of coding units wherein the two or more of the plurality of coding units share at least one coding parameter; and encoding the current block into the bitstream based on the group of coding units and the at least one shared coding parameter.

In general, at least one example of an embodiment can involve a bitstream as described herein, wherein producing the bitstream is based on a group of coding units that overlaps at least two different pipeline units associated with a pipelined decoding operation.

In general, at least one example of an embodiment can involve a group of coding units wherein at least one coding parameter that comprises prediction information is shared among two or more coding units included in the group of coding units. The prediction information shared among the two or more coding units can comprise the two or more coding units having the same prediction information.

In general, at least one example of an embodiment can involve at least one syntax element being provided to indicate a grouping of coding units. The at least one syntax element can be provided only in one coding unit in a group of coding units having the same prediction information. The one coding unit can be, in decoder-side processing order, a first coding unit in a group of coding units having the same prediction information.

In general, at least one example of an embodiment can involve a grouping of coding units to form a group of coding units wherein the grouping can be separately applied to at least one of a luma component or a chroma component.

In general, at least one example of an embodiment involving dividing a current block into a plurality of coding units can further involve the dividing being based on quad tree plus binary tree (QTBT) division.

In general, at least one example of an embodiment involving a group of coding units that overlaps at least two different pipeline units associated with a pipelined decoding operation can further involve each of the at least two different pipeline units corresponding to a respective one of a plurality of virtual pipeline decoding units (VPDU).

In general, at least one example of an embodiment can involve a group of coding units corresponding to a current tree node and all of its children.

In general, at least one example of an embodiment can involve a group of coding units comprising grouped sub-coding units having the same prediction information.

In general, at least one example of an embodiment can involve a non-transitory computer readable medium containing data content generated by an apparatus or a method as described herein, or associated with a bitstream as described herein.

In general, at least one example of an embodiment can involve a computer program product comprising instructions for performing a method as described herein when executed by one of more processors.

In general, at least one example of an embodiment can involve a device comprising: an apparatus as described herein; and at least one of (i) an antenna configured to receive a signal, the signal including data representative of the video data, (ii) a band limiter configured to limit the received signal to a band of frequencies that includes the data representative of the video data, and (iii) a display configured to display an image from the video data. The device can comprise one of a television signal receiver, a set-top box, a gateway device, a mobile device such as a mobile phone, laptop, tablet, etc., or other electronic device.

One or more embodiments also provide a method and apparatus for transmitting or receiving a bitstream generated according to a method described herein.

Various other embodiments have been described. Other embodiments may include any of the following features or entities, alone or in any combination, across various different claim categories and types:

Providing for video encoding comprising obtaining an indication that at least two coding units are sharing at least one coding parameter, and encoding video information based on the indication, wherein the encoding codes the shared at least one coding parameter in only one coding unit.

Providing for video decoding comprising obtaining an indication that at least two coding units of encoded video information are sharing at least one coding parameter, and decoding the encoded video information based on the indication, wherein the decoding obtains the shared at least one coding parameter from only one coding unit and decodes the at least two coding units based on the shared at least one coding parameter.

Providing for one or more syntax elements indicating that at least two coding units of video information are sharing at least one coding parameter, wherein the one or more syntax elements enable encoding and/or decoding the video information of the at least two coding units based on the shared at least one coding parameter.

Providing for a bitstream formed by including information providing an indication that at least two coding units of video information are sharing at least one coding parameter, wherein the included information enables decoding encoded video information in the bitstream corresponding to the at least two coding units based on the shared at least one coding parameter.

Providing, in an encoder and/or a decoder, for a flag on the coding tree level which indicates that all children CUs issued from current tree node are using the same prediction data.

Providing, in an encoder and/or a decoder, if some prediction data is shared by the CUs issued from a same tree node, then this prediction data is coded in the first CU in that group, in decoder-side processing order.

Providing, in an encoder and/or a decoder, for a flag that may appear at the binary+ternary tree level in the overall coding tree of a CTU or may appear either at the quad-tree level or the binary/ternary tree level in the splitting hierarchy.

Providing, in an encoder and/or a decoder, for in the case of separated Luma/Chroma coding trees, a flag that applies only in the components which are concerned by the considered coding tree and, thus, grouping may happen in Luma and not in the chroma CUs in same spatial area, or the reverse.

Providing, in an encoder and/or decoder, for the processing order on the decoder side being adapted according to a VPDU constraint.

Providing, in an encoder and/or decoder, for transform related syntax, e.g., cu_mts_flag and mts_idx syntax elements, to be grouped between concerned CUs.

Providing, in an encoder and/or decoder, for syntax associated with CU splitting that is compatible with other approaches, e.g., one or more of those contemplated by VVC.

Providing, in an encoder and/or decoder, for grouping prediction data among plural CUs, wherein the syntax grouping is signaled on the CU level.

Providing, in an encoder and/or decoder, for grouping prediction data among plural CUs, wherein the grouping can comprise grouping the prediction among several CUs on the ternary/binary coding tree level, rather than on the CU level.

Providing in a decoder for decoding a grouped_prediction_data_flag syntax element on the multi-type-tree level, and passing of the grouped_prediction data value to a recursive splitting process of a current CU into a sub-CU, wherein the non-split CU decoding process can be invoked with the additional argument parent_grouped_prediction_data_flag.

Providing, in an encoder and/or decoder, for including in syntax an additional quad-tree level flag, wherein an additional argument parent_grouped_prediction_data is used as the input and, if it is false, then the flag grouped_prediction_data_flag is signaled on the quad-tree level, in case current CU is split in a quad-tree way.

Providing in a decoder for a CU decoding process comprising testing the input grouped_prediction_data_flag value, and, if true and if current CU is not the first one in the group of CUs sharing the same prediction data, in deriving the prediction data of current CU based on the first CU in the group of CUs sharing the same prediction data.

Providing, in an encoder, for rate distortion optimization integrating the rate distortion optimized decision for prediction data grouping.

Providing, in an encoder, for rate distortion optimization including arguments comprising:
  the parent_grouped_prediction_flag which is true if prediction data grouping is used in the coding tree part that contains current CU; and
  the prediction data that is being grouped among plural CUs, wherein this represents the prediction data that is shared by plural CUs, including current CU is the flag parent_grouped_prediction_flag is true.

Providing, in an encoder and/or decoder, for prediction data that can be stored for subsequent usage in the case where the picture area corresponding to current CU is tested in prediction data grouping mode.

Providing, in an encoder and/or decoder, for grouping transform type signaling syntax among plural CUs in addition to prediction data.

Providing, in an encoder and/or decoder, for grouping transform type signaling syntax among plural CUs in addition to prediction data, wherein transform related data can comprise mts_flag and the mts_idx syntax elements.

Providing, in an encoder and/or decoder, for in the case of a CU grouped with some other CU, the cu_mts_flag is coded in a predictive way based on a preceding CU in the same group of CU sharing transform type information.

Providing, in an encoder and/or decoder, for in the case of a CU grouped with some other CU, the cu_mts_flag is coded with a CABAC context that is chosen based on the cu_mts_flag of some preceding CU in the same set of grouped CU sharing transform type information.

Providing, in an encoder and/or decoder, for tu_cbf_luma and/or the tu_cbf_cb and tu_cbf_cr syntax elements of the current CU, in the case of a CU grouped with some other CU, being coded conditionally to the tu_cbf_luma and/or the tu_cbf_cb and tu_cbf_cr syntax elements of some other CU in the same set of grouped CUs.

Providing, in an encoder and/or decoder, for implementing prediction data grouping accounting for a VPDU constraint on the decoding process.

Providing, in an encoder and/or decoder for processing video, for implementing the prediction (and optionally transform) data grouping method is applied to split a CU that overlaps two VPDU, to provide the possibility to share some prediction data, between blocks belonging to two different VPDUs;

Providing, in an encoder and/or decoder for processing video, for decoding order between CU being adapted to respect a VPDU constraint on the processing order, which states that the processing order of CUs shall not leave a VPDU and re-visit it later.

Providing, in an encoder and/or decoder for processing video, for the order in which Coding Units are decoded may change according to the configuration of the coding tree with respect to a VPDU grid.

Inserting in the signaling syntax, by an encoder, elements that enable a decoder to obtain from the signaling syntax an indication of a grouping of prediction data among plural coding units and decoding video information in accordance with the indication.

A bitstream or signal that includes one or more of the described syntax elements, or variations thereof.

Creating and/or transmitting and/or receiving and/or decoding a bitstream or signal that includes one or more of the described syntax elements, or variations thereof.

A TV, set-top box, cell phone, tablet, or other electronic device that performs video encoding and/or decoding according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs video encoding and/or decoding according to any of the embodiments described.

A TV, set-top box, cell phone, tablet, or other electronic device that receives (e.g. using an antenna) a signal over the air that includes an encoded image, and performs video encoding and/or decoding according to any of the embodiments described.

A computer program product storing program code that, when executed by a computer implements video encoding and/or decoding in accordance with any of the embodiments described.

A non-transitory computer readable medium including executable program instructions causing a computer executing the instructions to implement video encoding and/or decoding in accordance with any of the embodiments described.

A computer readable storage medium having stored thereon a bitstream generated in accordance with one or more aspects and/or embodiments described herein.

A method and apparatus for transmitting the bitstream generated in accordance with one or more aspects and/or embodiments described herein.

TABLE 1

| | Descriptor |
|---|---|
| coding_quadtree( x0, y0, log2CbSize, cqtDepth, treeType ) { <br>  if( ( ( ( x0 + ( 1 << log2CbSize ) <= pic_width_in_luma_samples ) ? 1 : 0 ) + <br>    ( ( y0 + ( 1 << log2CbSize ) <= pic_height_in_luma_samples ) ? 1 : 0 ) + <br>    ( ( ( 1 << log2CbSize ) <= MaxBtSizeY ) ? 1 : 0 ) ) >= 2 && <br>    log2CbSize > MinQtLog2SizeY ) <br>      qt_split_cu_flag[ x0 ][ y0 ] | ae(v) |
| } <br>if( qt_split_cu_flag[ x0 ][ y0 ] { <br>  x1 = x0 + ( 1 << ( log2CbSize − 1 ) ) <br>  y1 = y0 + ( 1 << ( log2CbSize − 1 ) ) <br>  coding_quadtree( x0, y0, log2CbSize − 1, cqtDepth + 1, treeType ) <br>  if( x1 < pic_width_in_luma_samples ) <br>    coding_quadtree( x1, y0, log2CbSize − 1, cqtDepth + 1, treeType ) <br>  if( y1 < pic_height_in_luma_samples ) <br>    coding_quadtree( x0, y1, log2CbSize − 1, cqtDepth + 1, treeType ) <br>  if( x1 < pic_width_in_luma_samples && y1 <pic_height_in_luma_samples ) <br>    coding_quadtree( x1, y1, log2CbSize − 1, cqtDepth + 1, treeType ) <br>} else <br>  multi_type_tree( x0, y0, 1 << log2CbSize, 1 << log2CbSize, 0, 0, 0, treeType ) <br>} | |

TABLE 2

| | Descriptor |
|---|---|
| multi_type_tree( x0, y0, cbWidth, cbHeight, mttDepth, depthOffset, partIdx, treeType ) { <br>  if( ( allowSplitBtVer \|\| allowSplitBtHor \|\| allowSplitTtVer \|\| allowSplitTtHor ) && <br>    ( x0 + cbWidth <= pic_width_in_luma_samples ) && <br>    (y0 + cbHeight <= pic_height_in_luma_samples ) ) <br>      mtt_split_cu_flag | ae(v) |
| if( mtt_split_cu_flag ) { <br>  if( ( allowSplitBtHor \|\| allowSplitTtHor ) && <br>    ( allowSplitBtVer \|\| allowSplitTtVer ) ) <br>      mtt_split_cu_vertical_flag | ae(v) |
|   if( ( allowSplitBtVer && allowSplitTtVer && mtt_split_cu_vertical_flag ) \|\| <br>    ( allowSplitBtHor && allowSplitTtHor && !mtt_split_cu_vertical_flag ) ) <br>      mtt_split_cu_binary_flag | ae(v) |
|   if( MttSplitMode[ x0 ][ y0 ][ mttDepth ] = = SPLIT_BT_VER ) { <br>    depthOffset += ( x0 + cbWidth > pic_width_in_luma_samples) ? 1 : 0 <br>    x1 = x0 + ( cbWidth / 2 ) <br>    multi_type_tree( x0, y0, cbWidth / 2, cbHeight, mttDepth + 1, depthOffset, 0, treeType ) <br>    if( x1 < pic_width_in_luma_samples ) <br>      multi_type_tree( x1, y0, cbWidth / 2, cbHeightY, mttDepth + 1, depthOffset, 1, treeType ) <br>  } else if( MttSplitMode[ x0 ][ y0 ][ mttDepth ] = = SPLIT_BT_HOR ) { <br>    depthOffset += (y0 + cbHeight > pic_height_in_luma_samples ) ? 1 : 0 <br>    y1 = y0 + ( cbHeight / 2 ) <br>    multi_type_tree( x0, y0, cbWidth, cbHeight / 2, mttDepth + 1, depthOffset, 0, treeType ) <br>    if( y1 < pic_height_in_luma_samples ) <br>      multi_type_tree( x0, y1, cbWidth, cbHeight / 2, mttDepth + 1, depthOffset, 1, treeType ) <br>  } else if( MttSplitMode[ x0 ][ y0 ][ mttDepth ] = = SPLIT_TT_VER ) { <br>    x1 = x0 + ( cbWidth / 4 ) <br>    x2 = x0 + ( 3 * cbWidth / 4 ) <br>    multi_type_tree( x0, y0, cbWidth / 4, cbHeight, mttDepth + 1, depthOffset, 0, treeType ) <br>    multi_type_tree( x1, y0, cbWidth / 2, cbHeight, mttDepth + 1, depthOffset, 1, treeType ) <br>    multi_type_tree( x2, y0, cbWidth / 4, cbHeight, mttDepth + 1, depthOffset, 2, treeType ) <br>  } else { /* SPLIT_TT_HOR */ <br>    y1 = y0 + ( cbHeight / 4) <br>    y2 = y0 + ( 3 * cbHeight / 4) <br>    multi_type_tree( x0, y0, cbWidth, cbHeight / 4, mttDepth + 1, depthOffset, 0, treeType ) <br>    multi_type_tree( x0, y1, cbWidth, cbHeight / 2, mttDepth + 1, depthOffset, 1, treeType ) <br>    multi_type_tree( x0, y2, cbWidth, cbHeight / 4, mttDepth + 1, depthOffset, 2 , treeType) <br>  } <br>} else <br>  coding_unit( x0, y0, cbWidth, cbHeight, treeType ) <br>} | |

TABLE 3

| | Descriptor |
|---|---|
| multi_type_tree( x0, y0, cbWidth, cbHeight, mttDepth, depthOffset, partIdx, treeType ) { | |
|   if( ( allowSplitBtVer \|\| allowSplitBtHor \|\| allowSplitTtVer \|\| allowSplitTtHor ) && | |
|     ( x0 + cbWidth <= pic_width_in_luma_samples ) && | |
|     (y0 + cbHeight <= pic_height_in_luma_samples ) ) | |
|     mtt_split_cu_flag | ae(v) |
|   if( mtt_split_cu_flag ) { | |
|     if( ( allowSplitBtHor \|\| allowSplitTtHor ) && | |
|       ( allowSplitBtVer \|\| allowSplitTtVer ) ) | |
|     mtt_split_cu_vertical_flag | ae(v) |
|     if( ( allowSplitBtVer && allowSplitTtVer && mtt_split_cu_vertical flag ) \|\| | |
|       ( allowSplitBtHor && allowSplitTtHor && !mtt_split_cu_vertical_flag ) ) | |
|     mtt_split_cu_binary_flag | ae(v) |
|   if( MttSplitMode[ x0 ][ y0 ][ mttDepth ] = = SPLIT_BT_VER ) { | |
|     depthOffset += ( x0 + cbWidth > pic_width_in_luma_samples ) ? 1: 0 | |
|     x1 = x0 + ( cbWidth / 2 ) | |
|     multi_type_tree( x0, y0, cbWidth / 2, cbHeight, mttDepth + 1, depthOffset, 0, treeType ) | |
|     if( x1 < pic_width_in_luma_samples ) | |
|       multi_type_tree( x1, y0, cbWidth / 2, cbHeightY, mttDepth + 1, depthOffset, 1, treeType ) | |
|   } else if( MttSplitMode[ x0 ][ y0 ][ mttDepth ] = = SPLIT_BT_HOR ) { | |
|     depthOffset += ( y0 + cbHeight > pic_height_in_luma_samples ) ? 1: 0 | |
|     y1 = y0 + ( cbHeight / 2 ) | |
|     multi_type_tree( x0, y0, cbWidth, cbHeight / 2, mttDepth + 1, depthOffset, 0, treeType ) | |
|     if( y1 < pic_height_in_luma_samples ) | |
|       multi_type_tree( x0, y1, cbWidth, cbHeight / 2, mttDepth + 1, depthOffset, 1, treeType ) | |
|   } else if( MttSplitMode[ x0 ][ y0 ][ mttDepth ] = = SPLIT_TT_VER ) { | |
|     x1 = x0 + ( cbWidth / 4 ) | |
|     x2 = x0 + ( 3 * cbWidth / 4 ) | |
|     multi_type_tree( x0, y0, cbWidth / 4, cbHeight, mttDepth + 1, depthOffset, 0, treeType ) | |
|     multi_type_tree( x1, y0, cbWidth / 2, cbHeight, mttDepth + 1, depthOffset, 1, treeType ) | |
|     multi_type_tree( x2, y0, cbWidth / 4, cbHeight, mttDepth + 1, depthOffset, 2, treeType ) | |
|   } else { /* SPLIT_TT_HOR */ | |
|     y1 = y0 + ( cbHeight / 4) | |
|     y2 = y0 + ( 3 * cbHeight / 4) | |
|     multi_type_tree( x0, y0, cbWidth, cbHeight / 4, mttDepth + 1, depthOffset, 0, treeType ) | |
|     multi_type_tree( x0, y1, cbWidth, cbHeight / 2, mttDepth + 1, depthOffset, 1, treeType ) | |
|     multi_type_tree( x0, y2, cbWidth, cbHeight / 4, mttDepth + 1, depthOffset, 2 , treeType) | |
|   } | |
| } else | |
|   If(!firstCuInParentNode) | |
|     grouped_prediction_data_flag | ae(v) |
|     if(grouped_prediction_data_flag) | |
|       coding_unit_grouped_prediction_data( x0, y0, cbWidth, cbHeight, treeType ) | |
|     else | |
|       coding_unit( x0, y0, cbWidth, cbHeight, treeType ) | |
| } | |

TABLE 4

| | Descriptor |
|---|---|
| coding_unit_grouped_prediction_data(x0, y0, cbWidth, cbHeight, treeType) { | |
|   if( slice_type != I ) { | |
|     cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|     if( treeType = = SINGLE_TREE \|\| treeType= = DUAL_TREE_LUMA ) { | |
|       intra_luma_mpm_flag[ x0 ][ y0 ] | ae(v) |
|       if( intra_luma_mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|     } | |
|     if( treeType = = SINGLE_TREE \|\| treeType = = DUAL_TREE_CHROMA ) | |
|       intra_chroma_pred_mode[ x0 ][ y0 ] | ae(v) |
|   } else { /* MODE_INTER */ | |
|     if( cu_skip_flag[ x0 ][ y0 ] ) { | |
|       if( sps_affine_enabled_flag && cbWidth >= 8 && cbHeight >= 8 && | |
|         ( MotionModelIdc[ x0 − 1 ][ y0 + cbHeight − 1 ] != 0 \|\| | |
|         MotionModelIdc[ x0 − 1 ][ y0 + cbHeight ] != 0 ) | |

TABLE 4-continued

| | Descriptor |
|---|---|

TABLE 4-continued

|  | Descriptor |
|---|---|
| if( CuPredMode[ x0 ][ y0 ] != MODE_INTRA && cu_skip_flag[ x0 ][ y0 ] = = 0 ) | |
|   cu_cbf | ae(v) |
| if( cu_cbf ) { | |
|   transform_tree( x0, y0, cbWidth, cbHeight, treeType ) | |
| } | |

TABLE 5

|  | Descriptor |
|---|---|
| multi_type_tree( x0, y0, cbWidth, cbHeight, mttDepth, depthOffset, partIdx, treeType, | |
| parent_grouped_prediction_data) { | |
|   if( ( allowSplitBtVer \|\| allowSplitBtHor \|\| allowSplitTtVer \|\| allowSplitTtHor ) && | |
|     ( x0 + cbWidth <= pic_width_in_luma_samples ) && | |
|     (y0 + cbHeight <= pic_height_in_luma_samples ) ) | |
|     mtt_split_cu_flag | ae(v) |
|   if( mtt_split_cu_flag ) { | |
|     if( !parent_grouped_prediction_data ) | |
|       grouped_prediction_data_flag | ae(v) |
|     if( ( allowSplitBtHor \|\| allowSplitTtHor ) && | |
|       ( allowSplitBtVer \|\| allowSplitTtVer ) ) | |
|     mtt_split_cu_vertical_flag | ae(v) |
|   if( ( allowSplitBtVer && allowSplitTtVer && mtt_split_cu_vertical_flag ) \|\| | |
|     ( allowSplitBtHor && allowSplitTtHor && !mtt_split_cu_vertical_flag ) ) | |
|     mtt_split_cu_binary_flag | ae(v) |
|   if( MttSplitMode[ x0 ][ y0 ][ mttDepth ] = = SPLIT_BT_VER ) { | |
|     depthOffset += ( x0 + cbWidth > pic_width_in_luma_samples ) ? 1: 0 | |
|     x1 = x0 + ( cbWidth / 2 ) | |
|     multi_type_tree( x0, y0, cbWidth / 2, cbHeight, mttDepth + 1, depthOffset, 0, treeType, | |
| grouped_prediction_data ) | |
|     if( x1 < pic_width_in_luma_samples ) | |
|       multi_type_tree( x1, y0, cbWidth / 2, cbHeightY, mttDepth + 1, depthOffset, 1, treeType, | |
| grouped_prediction_data ) | |
|   } else if( MttSplitMode[ x0 ][ y0 ][ mttDepth ] = = SPLIT_BT_HOR ) { | |
|     depthOffset += ( y0 + cbHeight > pic_height_in_luma_samples ) ? 1: 0 | |
|     y1 = y0 + ( cbHeight / 2) | |
|     multi_type_tree( x0, y0, cbWidth, cbHeight / 2, mttDepth + 1, depthOffset, 0, treeType, | |
| grouped_prediction_data ) | |
|     if( y1 < pic_height_in_luma_samples ) | |
|       multi_type_tree( x0, y1, cbWidth, cbHeight / 2, mttDepth + 1, depthOffset, 1, treeType, | |
| grouped_prediction_data ) | |
|   } else if( MttSplitMode[ x0 ][ y0 ][ mttDepth ] = = SPLIT_TT_VER ) { | |
|     x1 = x0 + ( cbWidth / 4 ) | |
|     x2 = x0 + ( 3 * cbWidth / 4 ) | |
|     multi_type_tree( x0, y0, cbWidth / 4, cbHeight, mttDepth + 1, depthOffset, 0, treeType, | |
| grouped_prediction_data ) | |
|     multi_type_tree( x1, y0, cbWidth / 2, cbHeight, mttDepth + 1, depthOffset, 1, treeType, | |
| grouped_prediction_data ) | |
|     multi_type_tree( x2, y0, cbWidth / 4, cbHeight, mttDepth + 1, depthOffset, 2, treeType, | |
| grouped_prediction_data ) | |
|   } else { /* SPLIT_TT_HOR */ | |
|     y1 = y0 + ( cbHeight / 4) | |
|     y2 = y0 + ( 3 * cbHeight / 4 ) | |
|     multi_type_tree( x0, y0, cbWidth, cbHeight / 4, mttDepth + 1, depthOffset, 0, treeType, | |
| grouped_prediction_data ) | |
|     multi_type_tree( x0, y1, cbWidth, cbHeight / 2, mttDepth + 1, depthOffset, 1, treeType, | |
| grouped_prediction_data ) | |
|     multi_type_tree( x0, y2, cbWidth, cbHeight / 4, mttDepth + 1, depthOffset, 2 , treeType, | |
| grouped_prediction_data ) | |
|     } | |
|   } else | |
|     If(!firstCuInParentNode) | |
|       if(parent_grouped_prediction_data) | |
|         coding_unit_grouped_prediction_data( x0, y0, cbWidth, cbHeight, treeType ) | |
|       Else | |
|         coding_unit( x0, y0, cbWidth, cbHeight, treeType ) | |
|     coding_unit( x0, y0, cbWidth, cbHeight, treeType ) | |
| } | |

TABLE 6

| | Descriptor |
|---|---|

```
coding_quadtree( x0, y0, log2CbSize, cqtDepth, treeType, parent_grouped_prediction_data) {
    if( ( ( ( x0 + ( 1 << log2CbSize ) <= pic_width_in_luma_samples ) ? 1 : 0 ) +
        ( ( y0 + ( 1 << log2CbSize ) <= pic_height_in_luma_samples ) ? 1 : 0 ) +
        ( ( ( 1 << log2CbSize ) <= MaxBtSizeY ) ? 1 : 0 ) ) >= 2 &&
        log2CbSize > MinQtLog2SizeY )
        qt_split_cu_flag[ x0 ][ y0 ]                                                ae(v)
    }
    if( qt_split_cu_flag[ x0 ][ y0 ] {
        if( !parent_grouped_prediction_data )
            grouped_prediction_data_flag                                            ae(v)
        x1 = x0 + ( 1 << ( log2CbSize − 1 ) )
        y1 = y0 + ( 1 << ( log2CbSize − 1 ) )
        coding_quadtree( x0, y0, log2CbSize − 1, cqtDepth + 1, treeType,
grouped_prediction_data )
        if( x1 < pic_width_in_luma_samples )
            coding_quadtree( x1, y0, log2CbSize − 1, cqtDepth + 1, treeType,
grouped_prediction_data )
        if( y1 < pic_height_in_luma_samples )
            coding_quadtree( x0, y1, log2CbSize − 1, cqtDepth + 1, treeType,
grouped_prediction_data )
        if( x1 < pic_width_in_luma_samples && y1 <pic_height_in_luma_samples )
            coding_quadtree( x1, y1, log2CbSize − 1, cqtDepth + 1, treeType,
grouped_prediction_data )
    } else
        multi_type_tree( x0, y0, 1 << log2CbSize, 1 << log2CbSize, 0, 0, 0, treeType,
grouped_prediction_data )
}
```

TABLE 7

| | Descriptor |
|---|---|

```
transform_unit( x0, y0, tbWidth, tbHeight, treeType, grouped_prediction_data ) {
    if( treeType = = SINGLE_TREE | | treeType = = DUAL_TREE_LUMA )
        tu_cbf_luma[ x0 ][ y0 ]                                                     ae(v)
    if( treeType = = SINGLE_TREE | | treeType = = DUAL_TREE_CHROMA ) {
        tu_cbf_cb[ x0 ][ y0 ]                                                       ae(v)
        tu_cbf_cr[ x0 ][ y0 ]                                                       ae(v)
    }
    if( ( ( ( CuPredMode[ x0 ][ y0 ] = = MODE_INTRA ) && sps_mts_intra_enabled_flag ) | |
        ( ( CuPredMode[ x0 ][ y0 ] = = MODE_INTER ) && sps_mts_inter_enabled_flag ) )
        && tu_cbf_luma[ x0 ][ y0 ] && treeType ! = DUAL_TREE_CHROMA
        && ( tbWidth <= 32) && ( tbHeight <= 32)
        && !grouped_prediction_data )
        cu_mts_flag[ x0 ][ y0 ]                                                     ae(v)
    if( tu_cbf_luma[ x0 ][ y0 ] )
        residual_coding( x0, y0, log2( tbWidth ), log2( tbHeight ), 0 )
    if( tu_cbf_cb[ x0 ][ y0 ])
        residual_coding( x0, y0, log2( tbWidth / 2 ), log2( tbHeight / 2 ), 1,
grouped_prediction_data )
    if( tu_cb_fcr[ x0 ][ y0 ])
        residual_coding( x0, y0, log2( tbWidth / 2 ), log2( tbHeight / 2 ), 2,
grouped_prediction_data )
}
```

TABLE 8

| | Descriptor |
|---|---|

```
residual_coding( x0, y0, log2TbWidth, log2TbHeight, cIdx, grouped_prediction_data ) {
    if( transform_skip_enabled_flag && ( cIdx ! = 0 | | cu_mts_flag[ x0 ][ y0 ] = = 0 ) &&
        ( log2TbWidth <= 2 ) && ( log2TbHeight <= 2 ) )
        transform_skip_flag[ x0 ][ y0 ][ cIdx ]                                     ae(v)
    last_sig_coeff_x_prefix                                                         ae(v)
    last_sig_coeff_y_prefix                                                         ae(v)
    if( last_sig_coeff_x_prefix > 3 )
        last_sig_coeff_x_suffix                                                     ae(v)
    if( last_sig_coeff_y_prefix > 3 )
        last_sig_coeff_y_suffix                                                     ae(v)
    log2SbSize = ( Min( log2TbWidth, log2TbHeight ) < 2 ? 1 : 2 )
```

TABLE 8-continued

| | Descriptor |
|---|---|
| ```
numSbCoeff = 1 << ( log2SbSize << 1 )
lastScanPos = numSbCoeff
lastSubBlock = ( 1 << ( log2TbWidth + log2TbHeight − 2 * log2SbSize ) ) − 1
do {
  if( lastScanPos = = 0 ) {
    lastScanPos = numSbCoeff
    lastSubBlock− −
  }
  lastScanPos− −
  xS = DiagScanOrder[ log2TbWidth − log2SbSize ][ log2TbHeight − log2SbSize ]
              [ lastSubBlock ][ 0 ]
  yS = DiagScanOrder[ log2TbWidth − log2SbSize ][ log2TbHeight − log2SbSize ]
              [ lastSubBlock ][ 1 ]
  xC = ( xS << log2SbSize ) +
       DiagScanOrder[ log2SbSize ][ log2SbSize ][ lastScanPos ][ 0 ]
  yC = ( yS << log2SbSize ) +
       DiagScanOrder[ log2SbSize ][ log2SbSize ][ lastScanPos ][ 1 ]
} while( ( xC != LastSignificantCoeffX ) | | ( yC != LastSignificantCoeffY ) )
numSigCoeff = 0
QState = 0
for( i = lastSubBlock; i >= 0; i− − ) {
  startQStateSb = QState
  xS = DiagScanOrder[ log2TbWidth − log2SbSize ][ log2TbHeight − log2SbSize ]
              [ lastSubBlock ][ 0 ]
  yS = DiagScanOrder[ log2TbWidth − log2SbSize ][ log2TbHeight − log2SbSize ]
              [ lastSubBlock ][ 1 ]
  inferSbDcSigCoeffFlag = 0
  if( ( i < lastSubBlock ) && ( i > 0 ) ) {
    coded_sub_block_flag[ xS ][ yS ]
    inferSbDcSigCoeffFlag = 1
  }
  firstSigScanPosSb = numSbCoeff
  lastSigScanPosSb = −1
  for( n = ( i = = lastSubBlock) ? lastScanPos − 1 : numSbCoeff − 1; n >= 0; n− − ) {
    xC = ( xS << log2SbSize ) + DiagScanOrder[ log2SbSize ][ log2SbSize ][ n ][ 0 ]
    yC = ( yS << log2SbSize ) + DiagScanOrder[ log2SbSize ][ log2SbSize ][ n ][ 1 ]
    if( coded_sub_block_flag[ xS ][ yS ] && ( n > 0 | | !inferSbDcSigCoeffFlag ) ) {
      sig_coeff_flag[ xC ][ yC ]
      if( sig_coeff_flag[ xC ][ yC ] )
        inferSbDcSigCoeffFlag = 0
    }
    if( sig_coeff_flag[ xC ][ yC ] ) {
      numSigCoeff++
      par_level_flag[ n ]
      rem_abs_gt1_flag[ n ]
      if( lastSigScanPosSb = = −1)
        lastSigScanPosSb = n
      firstSigScanPosSb = n
    }
    AbsLevelPass1 [ xC ][ yC ] =
         sig_coeff_flag[ xC ][ yC ] + par_level_flag[ n ] + 2 * rem_abs_gt1_flag[ n ]
    if( dep_quant_enabled_flag )
      QState = QStateTransTable[ QState ][ par_level_flag[ n ] ]
  }
  for( n = numSbCoeff − 1; n >= 0; n− − ) {
    if( rem_abs_gt1_flag[ n ] )
      rem_abs_gt2_flag[ n ]
  }
  for( n = numSbCoeff − 1; n >= 0; n− − ) {
    xC = ( xS << log2SbSize ) + DiagScanOrder[ log2SbSize ][ log2SbSize ][ n ][ 0 ]
    yC = ( yS << log2SbSize ) + DiagScanOrder[ log2SbSize ][ log2SbSize ][ n ][ 1 ]
    if( rem_abs_gt2_flag[ n ])
      abs_remainder[ n ]
    AbsLevel[ xC ][ yC ] = AbsLevelPass1[ xC ][ yC ] +
                2 * ( rem_abs_gt2_flag[ n ] + abs_remainder[ n ])
  }
  if( dep_quant_enabled_flag | | !sign_data_hiding_enabled_flag )
    signHidden = 0
  else
    signHidden = ( lastSigScanPosSb − firstSigScanPosSb > 3 ? 1 : 0 )
  for( n = numSbCoeff − 1; n >= 0; n− − ) {
    xC = ( xS << log2SbSize ) + DiagScanOrder[ log2SbSize ][ log2SbSize ][ n ][ 0 ]
    yC = ( yS << log2SbSize ) + DiagScanOrder[ log2SbSize ][ log2SbSize ][ n ][ 1 ]
    if( sig_coeff_flag[ xC ][ yC ] &&
        ( !signHidden | | ( n != firstSigScanPosSb ) ) )
      coeff_sign_flag[ n ]
  }
  if( dep_quant_enabled_flag ) {
``` | <br><br><br><br><br><br><br><br><br><br><br><br><br><br><br><br><br><br><br><br><br><br><br><br><br><br>ae(v)<br><br><br><br><br><br><br>ae(v)<br><br><br><br>ae(v)<br>ae(v)<br><br><br><br><br><br><br><br><br><br><br><br>ae(v)<br><br><br><br><br>ae(v)<br><br><br><br><br><br><br><br>ae(v)<br> |

TABLE 8-continued

Descriptor

```
            QState = startQStateSb
            for( n = numSbCoeff – 1; n >= 0; n– – ) {
               xC = ( xS << log2SbSize ) +
                   DiagScanOrder[ log2SbSize ][ log2SbSize ][ n ][ 0 ]
               yC = ( yS << log2SbSize ) +
                   DiagScanOrder[ log2SbSize ][ log2SbSize ][ n ][ 1 ]
               if( sig_coeff_flag[ xC ][ yC ] )
                  TransCoeffLevel[ x0 ][ y0 ][ cIdx ][ xC ][ yC ] =
                      ( 2 * AbsLevel[ xC ][ yC ] – ( QState > 1 ? 1 : 0 ) ) *
                      ( 1 – 2 * coeff_sign_flag[ n ])
               QState = QStateTransTable[ QState ][ par_level_flag[ n ] ]
         } else {
            sumAbsLevel = 0
            for( n = numSbCoeff – 1; n >= 0; n– – ) {
               xC = ( xS << log2SbSize ) +
                   DiagScanOrder[ log2SbSize ][ log2SbSize ][ n ][ 0 ]
               yC = ( yS << log2SbSize ) +
                   DiagScanOrder[ log2SbSize ][ log2SbSize ][ n ][ 1 ]
               if( sig_coeff_flag[ xC ][ yC ] ) {
                  TransCoeffLevel[ x0 ][ y0 ][ cIdx ][ xC ][ yC ] =
                      AbsLevel[ xC ][ yC ] * ( 1 – 2 * coeff_sign_flag[ n ])
                  if( signHidden ) {
                     sumAbsLevel += AbsLevel[ xC ][ yC ]
                     if( ( n = = firstSigScanPosSb ) && ( sumAbsLevel % 2 ) = = 1 ) )
                        TransCoeffLevel[ x0 ][ y0 ][ cIdx ][ xC ][ yC ] =
                           –TransCoeffLevel[ x0 ][ y0 ][ cIdx ][ xC ][ yC ]
                  }
               }
            }
         }
      }
   if( cu_mts_flag[ x0 ][ y0 ] && ( cIdx = = 0) &&
      ( ( CuPredMode[ x0 ][ y0 ] = = MODE_INTRA && numSigCoeff > 2 ) | |
        ( CuPredMode[ x0 ][ y0 ] = = MODE_INTER ) ) &&
      grouped_prediction_data_flag) {
      mts_idx[ x0 ][ y0 ]                                                          ae(v)
}
```

The invention claimed is:

1. Apparatus for video encoding, comprising one or more processors, wherein the one or more processors are configured to:
   divide a current block into a plurality of coding units;
   group two or more of the plurality of coding units into at least one group of coding units, wherein the grouping comprises
   associating an indication with each of the plurality of coding units, the indication indicating whether a shared coding information is to be used in the encoding of the respective coding unit; and
   encode the plurality of coding units of the current block, wherein:
      for a coding unit that is associated with an indication that the shared coding information is to be used, the encoding is performed based on a respective coding information derived from a neighboring coding unit, and
      for a coding unit that is associated with an indication that the shared coding information is not to be used, the encoding is performed based on a respective coding information determined for the coding unit.

2. The apparatus of claim 1, wherein the grouping is separately applied to at least one of a luma component or a chroma component.

3. The apparatus of claim 1, wherein the dividing of the current block into the plurality of coding units is based on quad tree plus binary tree (QTBT) division.

4. An apparatus for video decoding, comprising one or more processors, wherein the one or more processors are configured to:
   obtain, from a bitstream, a plurality of coding units divided from a current block;
   obtain an indication for each of the plurality of coding units, the indication indicating whether a shared coding information is to be used in the decoding of the respective coding unit; and
   decode the plurality of coding units of the current block, wherein:
      for a coding unit that is associated with an indication that the shared coding information is to be used, the decoding is performed based on a respective coding information derived from a neighboring coding unit, and
      for a coding unit that is associated with an indication that the shared coding information is not to be used, the decoding is performed based on a respective coding information parsed from the bitstream.

5. The apparatus of claim 4, wherein the shared coding information comprises prediction information.

6. The apparatus of claim 4, wherein the indication is associated with at least one syntax element indicating a grouping of coding units.

7. The apparatus of claim 4, wherein the current block corresponds to a current tree node and the plurality of coding units correspond to children of the current tree node.

8. The apparatus of claim 7, wherein the obtaining the indication for each of the plurality of coding units comprises:
   parsing, from the bitstream, grouping information; and
   propagating the grouping information through the children of the current tree node.

9. A non-transitory computer readable medium containing data content generated by the apparatus according to claim 4.

10. The apparatus of claim 4 further comprising:
at least one of (i) an antenna configured to receive a signal, the signal including data representative of the video data, (ii) a band limiter configured to limit the received signal to a band of frequencies that includes the data representative of the video data, and (iii) a display configured to display an image from the video data.

11. The apparatus of claim 10, wherein the apparatus is included in one of a television signal receiver, a set-top box, a gateway device, a mobile device, or other electronic device.

12. A method for video encoding, comprising:
dividing a current block into a plurality of coding units;
grouping two or more of the plurality of coding units into at least one group of coding units wherein the grouping comprises
associating an indication with each of the plurality of coding units, the indication indicating whether a shared coding information is to be used in the encoding of the respective coding unit; and
encoding the plurality of coding units of the current block, wherein:
for a coding unit that is associated with an indication that the shared coding information is to be used, the encoding is performed based on a respective coding information derived from a neighboring coding unit, and
for a coding unit that is associated with an indication that the shared coding information is not to be used, the encoding is performed based on a respective coding information determined for the coding unit.

13. A method for video decoding, comprising:
obtaining, from a bitstream, a plurality of coding units divided from a current block;
obtaining an indication associated for each of the plurality of coding units, the indication indicating whether a shared coding information is to be used in the decoding of the respective coding unit; and
decoding the plurality of coding units of the current block, wherein:
for a coding unit that is associated with an indication that the shared coding information is to be used, the decoding is performed based on a respective coding information derived from a neighboring coding unit, and
for a coding unit that is associated with an indication that the shared coding information is not to be used, the decoding is performed based on a respective coding information parsed from the bitstream.

14. A non-transitory computer readable medium storing program instructions that, when executed by one of more processors, perform the method of claim 13.

15. The method of claim 13, wherein the shared coding information comprises prediction information.

16. The method of claim 13, wherein the indication is associated with at least one syntax element indicating a grouping of coding units.

* * * * *